(12) United States Patent
Nishina

(10) Patent No.: US 6,671,917 B2
(45) Date of Patent: Jan. 6, 2004

(54) WHEEL CLEANING APPARATUS

(75) Inventor: Itsuo Nishina, Nagano-ken (JP)

(73) Assignee: Nishina Kogyo Corporation, Kitaazumi-gun (JP)

( * ) Notice: Subject to any disclaimer, the term of this patent is extended or adjusted under 35 U.S.C. 154(b) by 350 days.

(21) Appl. No.: 09/864,871

(22) Filed: May 25, 2001

(65) Prior Publication Data

US 2002/0004961 A1 Jan. 17, 2002

(30) Foreign Application Priority Data

May 29, 2000 (JP) .......................... 2000-157514
Apr. 6, 2001 (JP) .......................... 2001-108309

(51) Int. Cl.[7] ............................................. B60S 3/06
(52) U.S. Cl. .................. 15/53.4; 15/88.2; 15/88.3
(58) Field of Search ........................ 15/DIG. 2, 53.4, 15/103.5, 97.3, 88.2, 88.3, 256.5, 256.51, 256.52, 256.53

(56) References Cited

U.S. PATENT DOCUMENTS

| 3,729,763 A | * | 5/1973 | Coley ........................ 15/53.4 |
| 4,233,703 A | * | 11/1980 | Clyne et al. .................. 15/53.4 |
| 5,860,180 A | * | 1/1999 | Heise .......................... 15/88.2 |
| 6,427,566 B1 | * | 8/2002 | Jones et al. ................... 82/101 |

* cited by examiner

Primary Examiner—Terrence R. Till
Assistant Examiner—Shay L Balsis
(74) Attorney, Agent, or Firm—Armstrong, Kratz, Quintos, Hanson & Brooks

(57) ABSTRACT

A wheel cleaning apparatus for a wheelchair comprising a roller-assembly frame 50L which includes a first receiving roller 21L and a second receiving roller 22L which can do seesaw movement with respect to a rocking central axis shaft tube 53, and a restoring coil spring 68 for energizing the roller-assembly frame in a direction to relatively spring up the second receiving roller from the first receiving roller. When the front wheels T1 are to be separated from the apparatus, the second receiving roller 22L is pushed down and the first receiving roller 21L is sprung up, resulting in that it is easy for the front wheels T1 to climb over the step. Whereby the rear wheels are prevented from slipping off during cleaning, and it is easy for the front wheels to escape from the gap between the receiving rollers so that the load on the helper can be reduced.

32 Claims, 15 Drawing Sheets

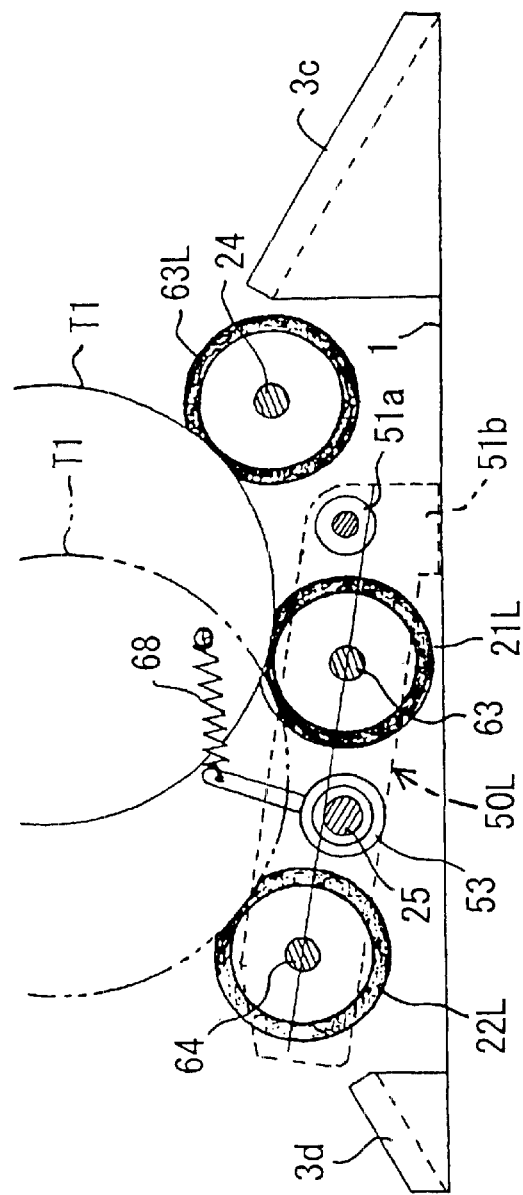
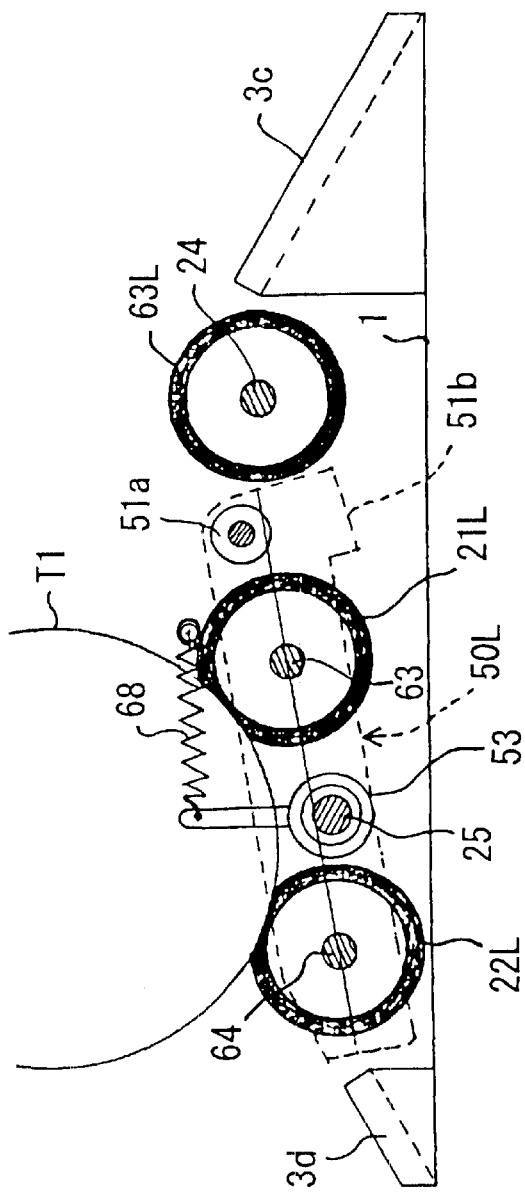
FIG. 9A
FIG. 9B

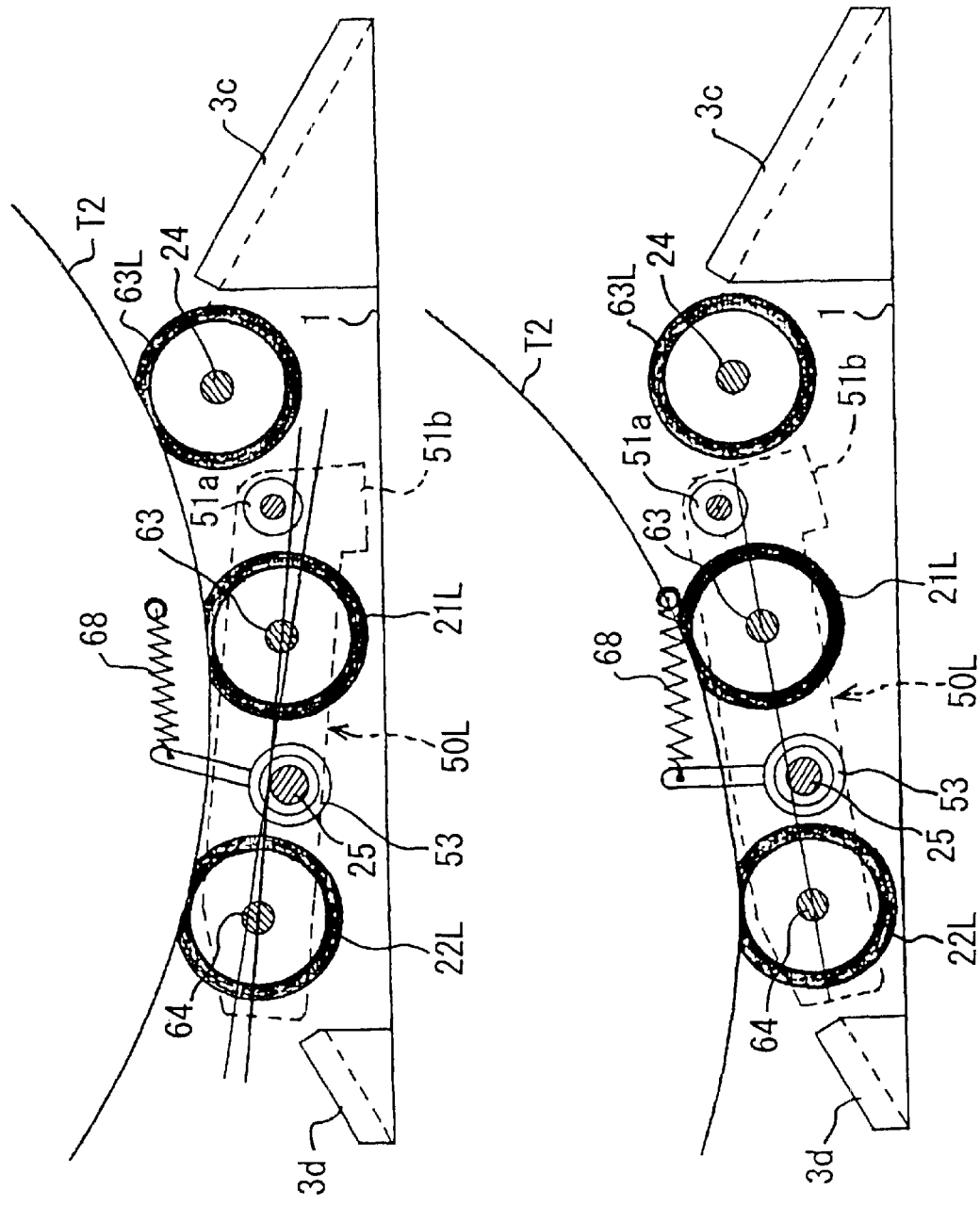

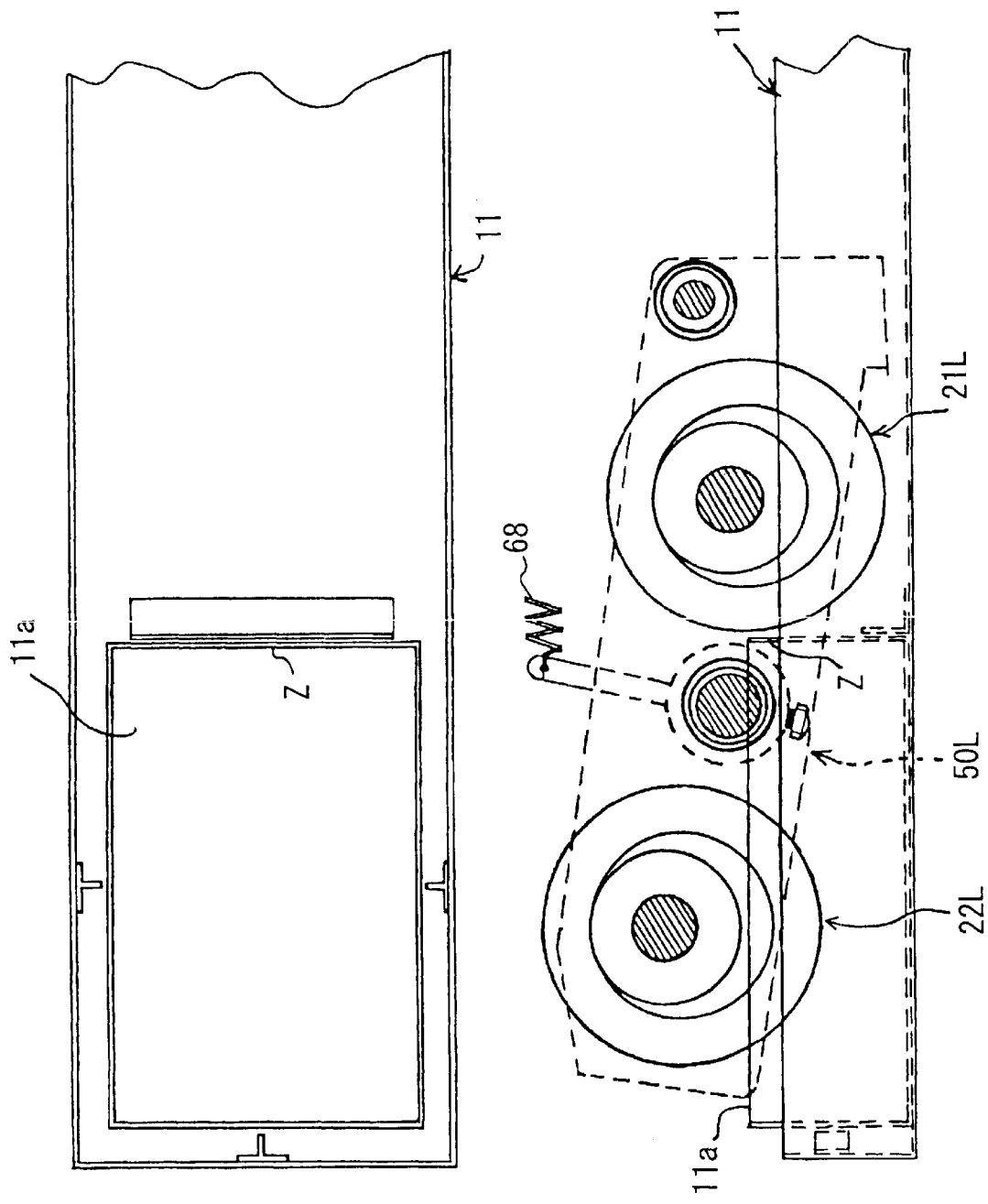

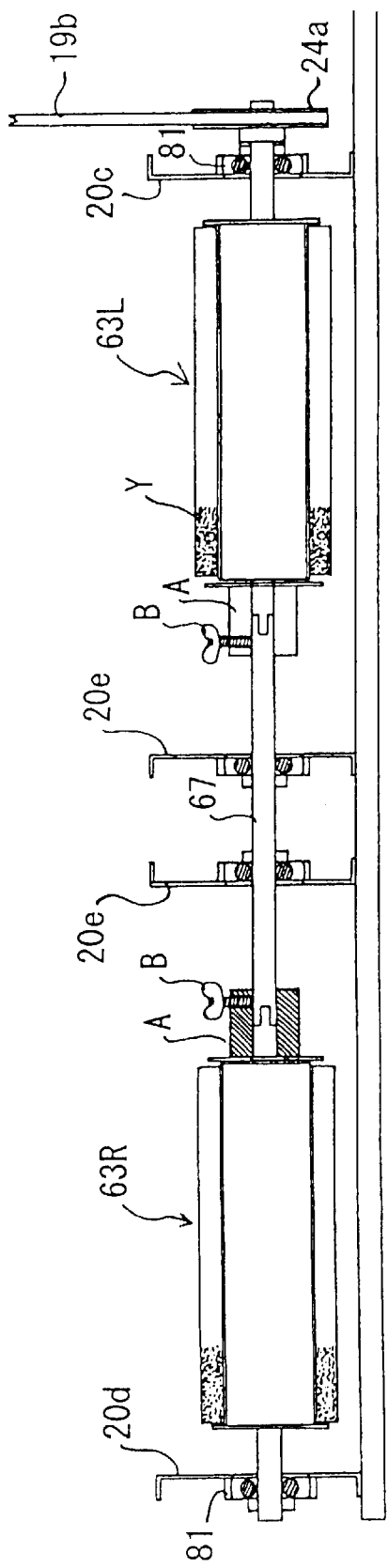
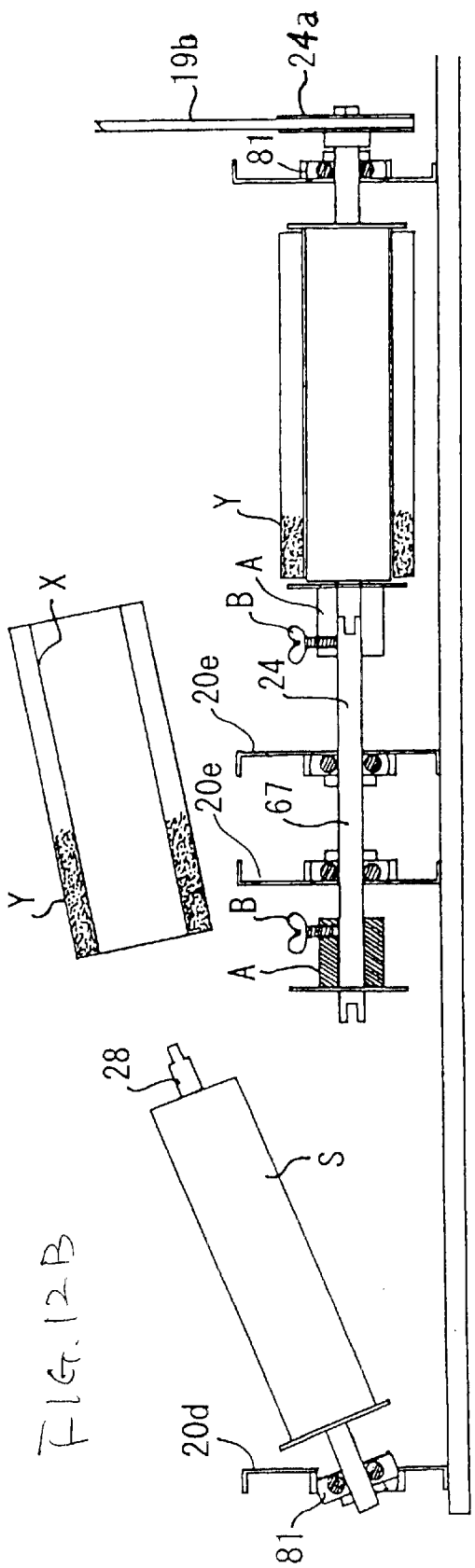
FIG. 12A
FIG. 12B

WHEEL CLEANING APPARATUS

BACKGROUND OF THE INVENTION

1. Filed of the Invention

The present invention relates to a wheel cleaning apparatus for a wheelchair capable of automatically cleaning the wheels while a person is getting on the wheelchair.

2. Description of the Related Art

At an entrance of a hospital, a nursing institution, or the like, it is indispensable to remove dirt such as disease-causing germs or mud attached to the wheels of a wheelchair in order to prevent the dirt from being brought into the hospital or the like. A wheel cleaning apparatus for a wheelchair is known which comprises first and second receiving rollers (parallel rollers) which can rotate while receiving the wheels, and which are almost parallel and arranged facing to each other, roller driving means for driving at least one of the first and second receiving rollers to rotate and a cleaning brush contacting the wheel which rotates on the receiving rollers in accordance with the rotation of the at least one receiving roller.

A wheelchair generally has rear wheels with large diameters (50–60 cm) and front wheels with small diameters (10–20 cm), which are free to change their directions in the right or in the left to change the course of the wheelchair. Also, in general, a wheel cleaning apparatus for a wheelchair is a floor-type apparatus, which is appropriately placed on the floor. Therefore, the positions of the first and second receiving rollers are higher than the floor surface and, accordingly, an upward slope plate and a downward slope plate must be provided to bridge the floor surface and the first and second receiving rollers. When the wheels are to be cleaned, a helper pushes the wheelchair to move it while a person is riding on the wheelchair. By this pushing of the wheelchair, the front wheels are pushed up on the upward slope plate and extend over the first and second receiving rollers. In this state, the front wheels are cleaned. During such cleaning of the front wheels, the rear wheels are on the upward slope plate. After cleaning the front wheels, the helper pushes the rear wheels up on the upward slope plate to place them over the first and second receiving rollers, and then the rear wheels are cleaned. During such cleaning of the rear wheels, the front wheels are on the downward slope plate. After cleaning the rear wheels, the wheelchair is slowly lowered from the downward slope plate to the floor.

In the above-mentioned wheel cleaning apparatus for a wheelchair, however, there are the following problems.

The interval between the first and second receiving rollers must be set to a sufficiently short distance so that the front wheels do not fall downward from the gap between the first and second receiving rollers. However, there are various diameters of the front wheels, from 10 cm to 20 cm depending on the type of the wheelchair. If the interval is set for a front wheel having the minimum diameter when it is employed as a standard front wheel, the rear wheels with large diameters tend to slip off the first and second receiving rollers against the helper's will. This is because, when a rear wheel having the large diameter is to be cleaned, the angle from the contact points between the rear wheel and the first and second rollers to the central axis of the rear wheel is small because of the large diameter. Therefore, the stability of the rear wheels when driven to rotate tends to be bad. On the other hand, if the interval between the rollers is set to large to avoid the wheels slipping off, the cleaning of the minimum diameter front wheels of a wheelchair is impossible. When the front wheels have medium diameters, the front wheels drop in the gap between the first and second receiving rollers when the front wheels are placed on the first and second receiving rollers by pushing the wheelchair to advance and climb the slope. Therefore, even when the wheelchair is strongly pushed after cleaning the front wheels, the roller at the escaping side obstructs the front wheels. It is hard to push over this. It is possible to push the rear wheels while raising the front wheels, however, this forces the helper to do something dangerous. Accordingly, it is very difficult to separate the front wheels from the gap. Therefore, the wheel cleaning apparatus of the rotary parallel roller type is not practical.

Second, in a wheel cleaning apparatus in which a cleaning brush is used to brush off dirt from the rotating wheels, only the dirt attached to the wheels is scraped off. Microscope objects such as bacteria cannot be removed. Further, the dust is scattered around, so the sanitary environment in the institution is damaged. Still further, there is a problem in that the cleaning brush itself must be periodically cleaned.

SUMMARY OF THE INVENTION

In view of the above-mentioned problems, a first object of the present invention is to provide a wheel cleaning apparatus for a wheelchair, in which slipping of the rear wheels during cleaning can be prevented, the front wheels can be easily separated from the gap between the receiving rollers, and the load on the helper can be reduced.

A second object of the present invention is to provide a wheel cleaning apparatus for a wheelchair, in which it is possible to automatically wash and wipe the wheels without forcing the helper to do cleaning work and it is possible to obtain a high reliability in removing the dirt from the wheels.

To attain the above-mentioned first object, the specific feature of the wheel cleaning apparatus for a wheelchair resides in that the parallel rollers are supported to be able to rock. That is, the wheel cleaning apparatus for a wheelchair according to the first aspect of the present invention comprises a roller-assembly frame including first and second receiving rollers which can rotate while receiving at least one wheel of the wheelchair, the first and second receiving rollers being almost parallel and arranged facing to each other, roller driving means driving the rotation of at least one of the first and second receiving rollers, cleaning means cleaning the at least one wheel driven to rotate on the first and second receiving rollers, a rocking and supporting mechanism supporting the roller-assembly frame so that the roller-assembly mechanism can rock in a positive and negative directions with respect to a central axis of the rocking, and energizing means energizing the roller-assembly frame in a direction so that the second receiving roller springs up from the first receiving roller.

It should be noted that, in this first aspect of the present invention, since the wheel cleaning apparatus for a wheelchair has a single pair of parallel rollers, the length of each of the parallel rollers must of course be larger than the distance between right and left wheels when the two rear wheels or two front wheels are to be placed in the roller-assembly frame and cleaned simultaneously.

The first and second receiving rollers may receive a single right or left wheel when each of the parallel rollers has a short length.

In the following, it is assumed that there is a single pair of parallel rollers receiving a single wheel.

When the parallel rollers do not receive the wheel, i.e., under an almost no load condition, the energizing means energizes the second receiving roller to spring up from the first receiving roller so that the roller-assembly frame is tilted. Therefore, in a front wheel cleaning stage, by placing the front wheel of the wheelchair from the first receiving roller, which is in a pressed down state, the placement operation becomes easy. At that time, since the front wheel contacts the sprung up second receiving roller, the second receiving roller functions as a wheel stopper. When the front wheel contacts the sprung up second receiving roller, the placement point is moved so that the roller-assembly frame begins to rock in a seesaw movement against the energizing force in a direction to push down the second receiving roller. As a result, the roller-assembly frame becomes stable between the loading force and the energizing force so that the front wheels can be cleaned. After cleaning the front wheels, if the wheelchair is further moved in the front direction, the load on the second receiving roller is increased so that the second receiving roller is pushed down to reduce the step barrier, and in contrast, the first receiving roller is sprung up so that the front wheels are pushed to the front direction by the first receiving roller, resulting in that it becomes easy to separate the front wheels from the parallel rollers. The pushing force by the helper to the wheelchair reduces the step barrier for the front wheels and at the same time is converted to a pushing force from behind. Therefore, even when the interval between the parallel rollers is expanded, the front wheels can easily be separated from the parallel rollers. Further, the rear wheels can be effectively prevented from slipping off.

It should be noted that, after the front wheels are separated from the receiving rollers, the profile of the roller-assembly frame returns back to the initial tilt profile in which the first receiving roller side is pushed down.

As this energizing means, it may be possible to employ a tensional wire connected between the roller-assembly frame and a dead weight body. However, it is preferable to employ elastic means such as a spring of, for example, a torsion spring or a coil spring because, in this case, it is possible to make the apparatus to have a small size and to reduce the weight, and in addition, when the apparatus loads the front wheel, an elastic reaction force is generated in accordance with the pushed-down length of the second receiving roller so that the function to stop the wheels by the second receiving roller is improved, resulting in that the positioning of the front wheels can be instantaneously stabled.

In principle, the central axis of rocking of the roller-assembly frame may be a point dividing externally of the central axes of the shafts of both rollers, however, it is desirable that the central axis of rocking is at a point dividing internally of the central axes of the shafts of both rollers. Further, it is desirable that a shaft body arranged between both rollers realizes the central axis of rocking. This not only decreases the space occupied by the apparatus but also expand the range of the rocking angle so that the wheel stopping function and the function to push from behind after escaping are improved. Still further, since the shaft body is arranged between both rollers, the front wheels do not fall into the gap between the rollers even when the diameter of the front wheel is the minimum, and therefore, various types of wheelchairs can be applied to this apparatus for cleaning the wheels. Still further, a tiptoe of the helper is prevented from being fallen into the gap between the both rollers.

During cleaning of the front wheels, since all of the loads are not applied on the parallel rollers, and in addition, since the diameter of the front wheel is small, the front wheels are driven to rotate in a stable state. During cleaning of the rear wheels, however, almost all loads of the wheelchair are applied to the parallel rollers. Therefore, the roller-assembly frame rocks to oscillate more or less when a person to be helped moves to move the center of gravity of the wheelchair, resulting in that the stability is deteriorated.

To avoid the above problem, there is provided, in the outside of the roller-assembly frame, a third receiving roller as a subsidiary roller. The third receiving roller can rotate while receiving wheels of the wheelchair. The third receiving roller is almost parallel to the first receiving roller and arranged adjacent to the first receiving roller. It is desirable that the central axis of the rotation of the third receiving roller is at a position higher than the central axis of the rocking. When the real wheels are in contact the parallel rollers of the roller-assembly frame, the lower side arcs of the rear wheels having large diameters come to closely contact the parallel rollers which are in the rocking motion, so that the lower-side arcs are supported at the three points by the three rollers, resulting in that the stability during the cleaning of the front wheels is ensured.

When the third receiving roller is provided, it is desirable that the roller-assembly frame comprises a fall preventing body placed in a narrow gap between the first receiving roller and the third receiving roller, for preventing the wheels from being fallen into the narrow gap. The fall preventing body appears or disappears depending on the rocking movement of the roller-assembly frame so as to prevent the front wheels having the minimum diameter from falling, and the strength of the roller-assembly frame itself can be increased.

To attain the above-mentioned second object, there is provided, according to the present invention, a wheel cleaning apparatus for a wheelchair, wherein at least one of the first and second receiving rollers comprises a tube shaped body made of water-absorbing material and having an elastic contraction characteristic, the tube shaped body being fitted on the outer periphery of a rotary shaft portion, the cleaning means comprises the tube shaped body and washing liquid putting means for wetting the lower side of the tube.

Consider the wheel, which is in contact with the parallel rollers by pressure so as to be driven to rotate. At the side of the first receiving roller, the washing liquid from the washing liquid putting means wets the lower side of the first receiving roller. After the lower side of the water-absorbing material absorbs the washing liquid such as liquid medicine to be swelled, the liquid-absorbing swelling part rotates to be in contact by pressure, at its upper portion, with the lower end portion of the wheel so that the liquid-absorbing swelling portion is pressed to contract. During the contraction, the liquid in the upper contraction portion is squeezed out to continuously form a liquid pool (liquid cut portion) in a narrow gap between the tube shaped body and the wheel at the contact-starting end side, By this, the wheel is driven to rotate while the grounding side surface of the wheel is relatively being soaked in the liquid pool. Therefore, the grounding side surface of the wheel is continuously met with the nozzle-type washing. Thus, the dirt or the like on the grounding-side surface of the wheel can be washed away. Accordingly, since the wheel can be cleaned automatically, uniformly and with a high washing power, the dirt is not scattered as well as micro objects can be removed.

The amount of the held liquid in the liquid pool is determined by the ratio between the diameters of the receiving roller and the wheel, the rotating speed, the surface tension of the liquid, etc. The washing liquid squeezed out from the upper contracted portion is dammed up by the said upper contracted portion so that almost no washing liquid is transmitted to the narrow gap at the contact-ending side between the first receiving roller and the wheel. When the liquid-absorbing swelling portion has passed the position where the pressure between the first receiving roller and the wheel is the maximum pressure, the water-absorbing material itself recovers its shape by the elastic contraction characteristic to expand. Therefore, between the position of the maximum pressure and the contacting-end edge, the liquid on the wet layer on the grounding-side surface of the wheel is absorbed and wiped by the expanded absorbing material. Thus, not only the nozzle-type washing function, but also the wiping function of the wet layer can be expected. Further, since the tube shaped body itself is washed by the washing liquid, it can be always kept clean so that it is not necessary to remove dirt from the tube shaped body which is cleaning means.

As the tube shaped body functioning as a washing tube, it has the outer perimeter made of water-absorbing material having elastic contraction characteristic. The water-absorbing material having the elastic contraction characteristic can be made of elastic extensible material of porous material such as sponge, gigging having micro gaps through which the capillary phenomena can be seen, or fiber or nonwoven fabric cloth material such as felt. It may also be possible to employ material having water absorbing and water holding property, and which may be subjected to elastic deformation.

It is desirable that the tube shaped body has in its internal periphery a core tube capable of circumferentially sliding on the rotary shaft portion. By this construction, when the water-absorbing material has been worn, only the water-absorbing material can be pulled out from the core tube to exchange. Therefore, the running costs can be reduced in comparison to the case when the receiving roller as a whole is exchanged. Further, the core tube is made in such a way that when a restricting force is applied to the core tube, the core tube is slipped with respect to the rotary shaft portion so that the core tube does not rotate together with the rotary shaft portion. By this construction, when a hand or a leg touches with the washing tube, the tube shaped body stops its rotation. Therefore, accidents such as clothes are caught by the rollers can be prevented so that the safety is ensured. Preferably, when the apparatus does not load the wheels, the tube shaped body does not rotate even when the rotary shaft portion is rotating. To this end, the core tube is preferably made of hard material with low friction. By this construction, when the rotary shaft portion is started to rotate when the apparatus is loading the wheels, the liquid such as liquid medicine is not scattered.

It is desirable that the washing liquid putting means is a liquid pooling vessel for soaking the lower side of the tube shaped body in the washing liquid.

To make the core tube to be able to circumferentially slide on the rotary shaft portion, it may be possible to insert ball bearings in the gap between the core tube and the rotary shaft portion or to fill up with lubricant liquid such as grease. However, it is not desired that grease or the like is soaked in the liquid pooling vessel. Therefore, as the simplest construction, the core tube is simply fitted to the outside of the rotary shaft portion under a clearance fit condition.

Further, it is desirable that the tube shaped body is a circumscribed-type tube shaped body having a core tube the lower arc side of which remains an idle gap and the upper arc side of which contacts with the rotary shaft portion. By intentionally providing the idle gap larger than a fitting tolerance between the rotary shaft portion and the core tube so as to limit the contacting area between them, a multi-contact friction wheelchair is realized in which the core tube has a limited friction contact portion at the upper arc side of the rotary shaft portion. Therefore, when the parallel rollers are not loading the wheels, the rotary friction force is not generated even when the rotary shaft portion is rotating so that the core tube does not rotate, and in contrast, when the tube shaped body is rotating while the parallel rollers are loading the wheels, if a hand or a leg touches with the tube shaped body to apply a restriction force to the tube shaped body, the rotation of the tube shaped body will stop due to a torque limiter function.

In particular, when the internal diameter of the core tube of the tube shaped body is considerably larger than the outer diameter of the rotary shaft portion, the central axis of rotation of the core tube is lower than the central axis of rotation of the rotary shaft portion. Therefore, the depth of the liquid pooling vessel, in which the lower side of the tube shaped body is soaked, can be made to be sufficiently long in such a degree as the distance in which the rotary shaft portion and the liquid pooling vessel do not interact to each other. As a result, the amount of the pooled liquid medicine, which is expendable supplies, can be made sufficient so that the bother in pouring and adding the liquid can be reduced. Still further, when the rotary shaft portion rotates while gravels are being caught at the upper contacting position between the rotary shaft portion and the core tube, the core tube may be spoiled by impulse kill due to friction or the like if the above-mentioned idle gap is not present. However, since there is the idle gap at the lower end portion, the washing liquid flows into the idle gap so that the attached gravels are washed away. Thus, the tube shaped body can be prevented from being spoiled.

In the above-described construction, at least one of the parallel rollers comprises a tube shaped body made of water-absorbing material and having an elastic contraction characteristic. Alternatively, each of the first to the third receiving rollers may have a construction to have a tube shaped body fitted on the outer periphery of a rotary shaft portion, and may be made of water-absorbing material having an elastic contraction characteristic. In this case, the cleaning means is constructed by the tube shaped body and washing liquid putting means for wetting the lower side of the tube shaped bodies of the first and second receiving rollers. The tube shaped bodies of the first and second receiving rollers each has the function as the washing tube as mentioned before, so that the washing effect can be improved by double washing. Further, the third receiving roller can wipe the water attached to the wheels so that it functions as a wiping tube. As a result, the washing time can be shortened.

In the above case also, it is desirable that each of the tube shaped bodies has in its internal periphery a core tube capable of circumferentially sliding on the rotary shaft portion. Further, it is desirable that each of the tube shaped bodies is a circumscribed-type tube shaped body having a core tube the lower arc side of which remains an idle gap and the upper arc side of which contacts with said rotary shaft portion.

When the tube shaped bodies of the first and second receiving rollers function as washing tube S, a common liquid pooling vessel may be provided to soak the lower sides of the tube shaped bodies of both rollers, however, if the common liquid pooling vessel is employed, there will be the following disadvantage. That is, during washing of the rear wheels, the first receiving roller is in a state of pushed down while the second receiving roller is in a state of sprung up. Therefore, when the washing liquid is exhausted so that the liquid surface of the liquid pooling vessel is lowered, the lower side of the tube shaped body of the second receiving roller is not soaked in the washing liquid, resulting in that the tube shaped body of the second receiving roller does not function as the washing tube.

To avoid the above disadvantage, it is desirable that the liquid putting means separately comprises a first liquid pooling vessel for soaking the lower side of the tube shaped body of the first receiving roller in the washing liquid and a second liquid pooling vessel for soaking the lower side of the tube shaped body of the second receiving roller in the washing liquid. By this construction, since the washing liquid in the second liquid pooling vessel is consumed only for the tube shaped body of the second receiving roller, the washing function of both tube shaped bodies can be continued for a long time regardless of the level of the liquid surface of the first liquid pooling vessel, resulting in that the bother in pouring and adding the washing liquid can be reduced.

Here, it is desirable that the second liquid pooling vessel is in the first liquid pooling vessel, and the upper edge of a vessel wall, in the vessel walls of the second liquid pooling vessel, at the side of the first receiving roller, is close to or in contact with the moving-upward outer surface of the tube shaped body of the first receiving roller. By this construction, the washing liquid is drawn by the absorbing and swelling the liquid by the water absorbing material on the moving-upward outer surface of the tube shaped body of the first receiving roller, and then is discharged to the liquid puddle. Then the liquid falls down along the moving-upward outer surface to be collected in the first liquid pooling vessel. Since the upper end of the vessel wall of the second liquid pooling vessel is close to or in contact with the moving-upward outer surface of the tube shaped body of the first receiving roller, the falling down washing liquid at the upper end is branched in accordance with the degree of the closeness or the contact. Then the second liquid pooling vessel receives the branched liquid. Thus, the washing liquid in the first liquid pooling vessel is transported to the second liquid pooling vessel by the tube shaped body of the first receiving roller. Further, when the transporting function is energetic, the second liquid pooling vessel overflows so that the overflowed liquid is returned back to the first liquid pooling vessel. Accordingly, by this circulating system of the washing liquid, once the first liquid pooling vessel is filled with the washing liquid, double washings can be continued until all of the washing liquid is consumed. Therefore, the bother in pouring and adding the washing liquid can be reduced, and the time necessary to wash the wheels can be shortened.

The first liquid pooling vessel has a function to receive the overflowed liquid from the second liquid pooling vessel. Therefore, generally a space, which covers three rollers, is needed. To avoid the interference with the rotary shaft portion or the like, the upper edge of the vessel wall cannot be so high for the purpose to increase the amount of the washing liquid. However, since the plane of the second liquid pooling vessel can be limited to the place under the second receiving roller, the upper edge of the vessel wall of the second liquid pooling vessel can be made to be higher than the upper edge of the vessel wall of the first liquid pooling vessel. In this case, the amount of the washing liquid as a whole can be increased so that the bother in pouring and adding the washing liquid can be further reduced.

Next, according to the second aspect of the present invention, there is provided a wheel cleaning apparatus for a wheelchair, comprising a pair of left and right roller-assembly frames. That is, to attain the above-mentioned first object, the apparatus comprises left and right roller-assembly frames each including first and second receiving rollers. In each roller-assembly frame, the first and second receiving rollers are able to rotate while receiving at least one wheel of the wheelchair. The first and second receiving rollers are almost parallel and arranged facing to each other. The apparatus further comprises roller driving means synchronously driving the rotation of at least one of the first and second receiving rollers in one of said roller-assembly frames and at least one of the first and second receiving rollers in the other one of said roller-assembly frames. The receiving rollers are driven synchronously to each other. Each of the roller-assembly frames still further comprises cleaning means cleaning the at least one wheel which is being driven to rotate on the first and second receiving rollers. Each of the roller-assembly frames still further comprises a rocking and supporting mechanism supporting the roller-assembly frame so that the roller assembling and supporting mechanism can rock in positive and negative directions with respect to a central axis of the rocking. Each of the roller-assembly frames still further comprises energizing means energizing the roller-assembly frame in a direction to spring up the second receiving roller from the first receiving roller in each of the roller-assembly frames.

By this construction also, both wheels can be cleaned simultaneously. In addition, as mentioned before, even when the interval between both wheels is set to expand, the front wheels can be easily from the apparatus. Further, the rear wheels can be effectively prevented from slipping off.

In this second aspect, because of the same reason as above, it is desirable that the energizing means is elastic means. The central axis of the rocking may be realized by a shaft body arranged in a narrow gap between the first and second receiving rollers, however, preferably, the central axis is realized by a shaft tube because a power-transmission shaft can penetrate through the shaft tube of the central axis of rocking. By this construction, the power can be transmitted to the intermediate area in the left and right roller-assembly frames without interfering to the rocking area of the left and right roller-assembly frames.

In the above construction in which the power transmission shaft is penetrated through the shaft tube, a first rotary shaft of the first receiving roller in the right roller-assembly frame and a first rotary shaft of the first receiving roller in the left roller-assembly frame are on the same axis through a first junction shaft; a second rotary shaft of the second receiving roller in the right roller-assembly frame and a second rotary shaft of the second receiving roller in the left roller-assembly frame are on the same axis through a second junction shaft; and the apparatus further comprises a power distributing mechanism for distributing and transmitting a power from the power transmission shaft to the first junction shaft and the second junction shaft. By this construction, since the power distributing mechanism is arranged in the intermediate of the left and right roller-assembly frames, the driving system can be simplified. Further, since the left and right rotary shafts can be driven at the center, a delay due to torsion of the rotary shaft does not appear so that the synchronicity of the left and right rotations is stabilized.

As the power distributing mechanism, it may be possible to employ the construction having a first winding and hanging mechanism transmitting the power from the power transmitting shaft to either one of the junction shafts, and a second winding and hanging mechanism transmitting the power from the one of the junction shafts to the other one of the junction shafts such as a roller chain. By this construction, since there is provided the second winding and hanging mechanism for winding and hanging the chain from the one of the junction shafts to the other one of the junction shafts, the synchronicity of the left and right rotations is stabilized in comparison with the case where the chains are separately wound and hanged from the power transmission shaft to the one junction shaft and to the other junction shaft.

Further, each of the roller-assembly frames is desired to comprise a bearing portion bearing the first and second rotary shafts in such a way as to be able to freely rotate and to be able to move to be tilted, the connecting edge portion of each of the first rotary shaft and the first junction shaft being a mutual inserting-type edge, and a hand touching sleeve fitted on the each connecting edge portion being fixed by fixing means in such a way that it can be attached or removed. By releasing the fixing means and by sliding the hand touching sleeve in a direction toward the junction shaft, the rotary shaft can be moved to tilt by using the bearing portion as its fulcrum. Therefore, the receiving roller can be drawn from the rotary shaft so that the bother in the maintenance and exchange of the receiving roller can be reduced. As the mutual inserting-type edges, a female end portion having an expanding slit and a male end portion having an inserting piece, or end portions having half cylindrical shapes to each other may be employed. As fixing means, a setscrew or a spring to set by pressure may be employed.

Similar to the first aspect of the present invention, in the outside of each of the roller-assembly frames, the apparatus comprises a third receiving. The third receiving roller can rotate while receiving at least one wheel of the wheelchair. The third receiving roller is almost parallel to the first receiving roller and arranged adjacent to the first receiving roller. It is desirable that the central axis of the rotation of the third receiving roller is at a position higher than the central axis of the rocking. Further, it is desirable that each roller-assembly frame comprises a fall preventing body placed in a narrow gap between the first receiving roller and the third receiving roller, for preventing the wheels from being fallen into the narrow gap.

According to the second aspect of the present invention, at least one of the first and second receiving rollers in each roller-assembly frame comprises a tube shaped body made of water-absorbing material and having an elastic contraction characteristic, the tube shaped body being fitted on the outer periphery of a rotary shaft portion, the cleaning means comprises the tube shaped body and washing liquid putting means for wetting the lower side of the tube shaped body.

In this construction also, the tube shaped body has in its internal periphery a core tube capable of circumferentially sliding on the rotary shaft portion. It is desirable that the tube shaped body is a circumscribed-type tube shaped body having a core tube the lower arc side of which remains an idle gap and the upper arc side of which contacts with said rotary shaft portion. As the liquid putting means, a liquid pooling vessel for soaking the lower side of the tube shaped body in the washing liquid can be employed. The tube shaped body is a circumscribed-type tube shaped body having a core tube the lower arc side of which remain an idle gap and the upper arc side of which contacts with the rotary shaft portion.

Further, each of the receiving rollers may comprise a tube shaped body made of water-absorbing material and having an elastic contraction characteristic, the tube shaped body being fitted on the outer periphery of a rotary shaft portion. The cleaning means may comprise the tube shaped bodies and washing liquid putting means for wetting the lower side of the tube shaped bodies of the first and second receiving rollers in the each roller-assembly frame. Each tube shaped body has in its internal periphery a core tube capable of circumferentially sliding on the rotary shaft portion, and the tube shaped body is a circumscribed-type tube shaped body having a core tube the lower arc side of which remains an idle gap and the upper arc side of which contacts with the rotary shaft portion.

When the washing liquid putting means comprises a first liquid pooling vessel for soaking the lower side of the tube shaped body of the first receiving roller in the washing liquid, and a second liquid pooling vessel for soaking the lower side of the tube shaped body of the second receiving roller in the washing liquid, it is desirable that the second liquid pooling vessel is in the first liquid pooling vessel, the upper edge of a vessel wall, in the vessel walls of the second liquid pooling vessel, at the side of the first receiving roller, is close to or in contact with the moving-upward outer surface of the tube shaped body of the first receiving roller. It is also desirable that the upper edge of the vessel wall of the second liquid pooling vessel is at a position higher than the upper edge of the vessel wall of the first pooling vessel.

It should be noted that, in the present invention, "wheelchair" includes an ambulance stretcher wheel.

BRIEF DESCRIPTION OF THE DRAWINGS

The above objects and features of the present invention will be more apparent from the following description of the preferred embodiments when read in conjunction with the accompanying drawings, wherein:

FIG. 9A is a side view showing a state when a front wheel is being washed by the same apparatus;

FIG. 9B is a side view showing a state when the front wheel is escaping from the same apparatus;

FIG. 10A is a side view showing a state when the rear wheel is being washed by the same apparatus;

FIG. 10B is a side view showing a state when the rear wheel is being escaping from the same apparatus;

FIG. 11A is a plan view showing another aspect of a drawer and a dish for liquid medicine in the same apparatus;

FIG. 11B is a side view of the drawer and the dish in FIG. 11A;

FIG. 12A is a general diagram showing the aspect to fit the receiving roller in the same apparatus;

FIG. 12B is a general diagram showing the aspect to remove the receiving roller in the same apparatus;

DESCRIPTION OF THE PREFERRED EMBODIMENTS

Next, embodiments of the present invention will be described with reference to the accompanying drawings.
(Embodiment 1)

Figure 1:
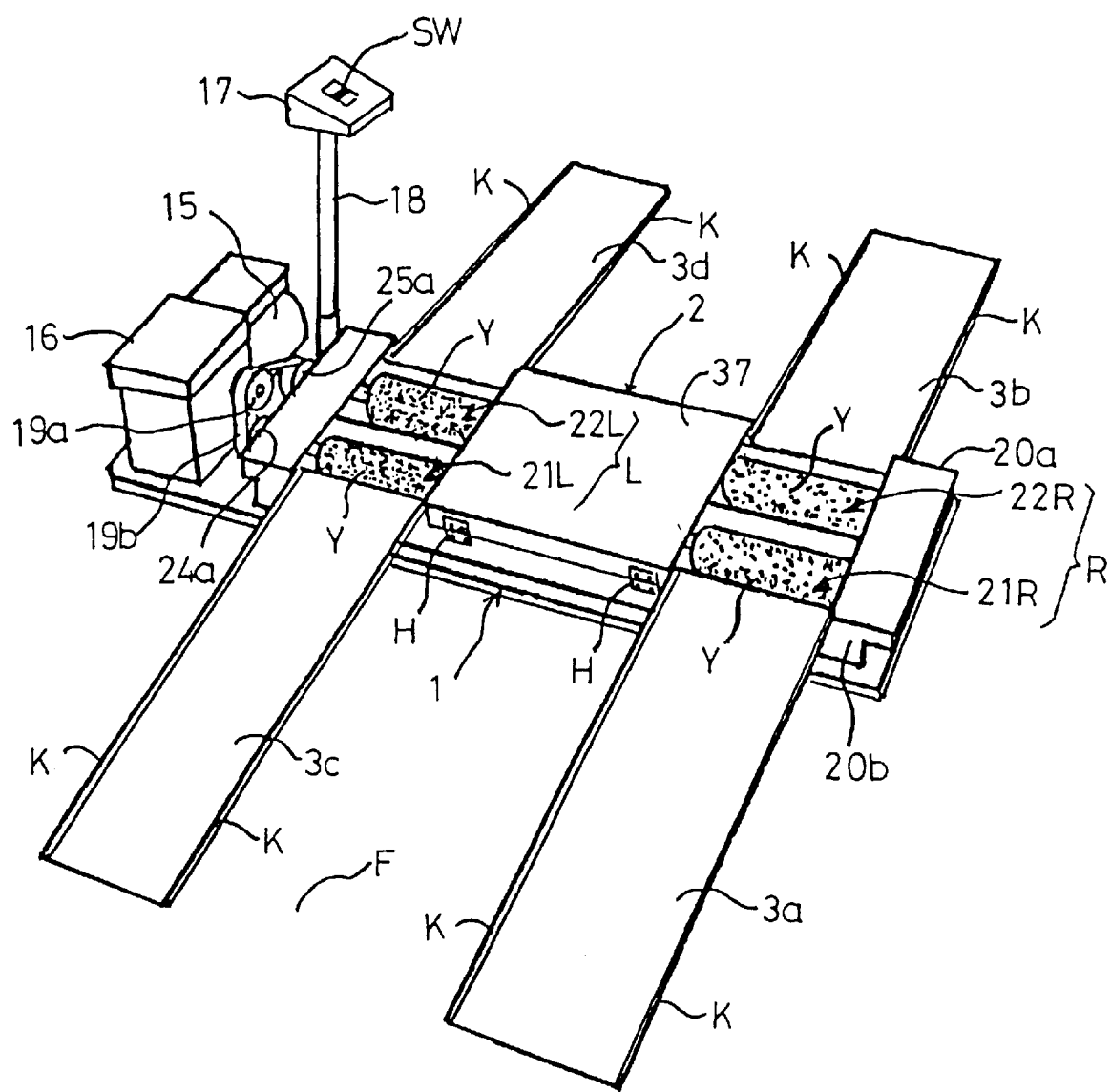
FIG. 1 is an outward perspective view showing a wheel cleaning apparatus for a wheelchair according to an embodiment of the present invention.
Figure 2:
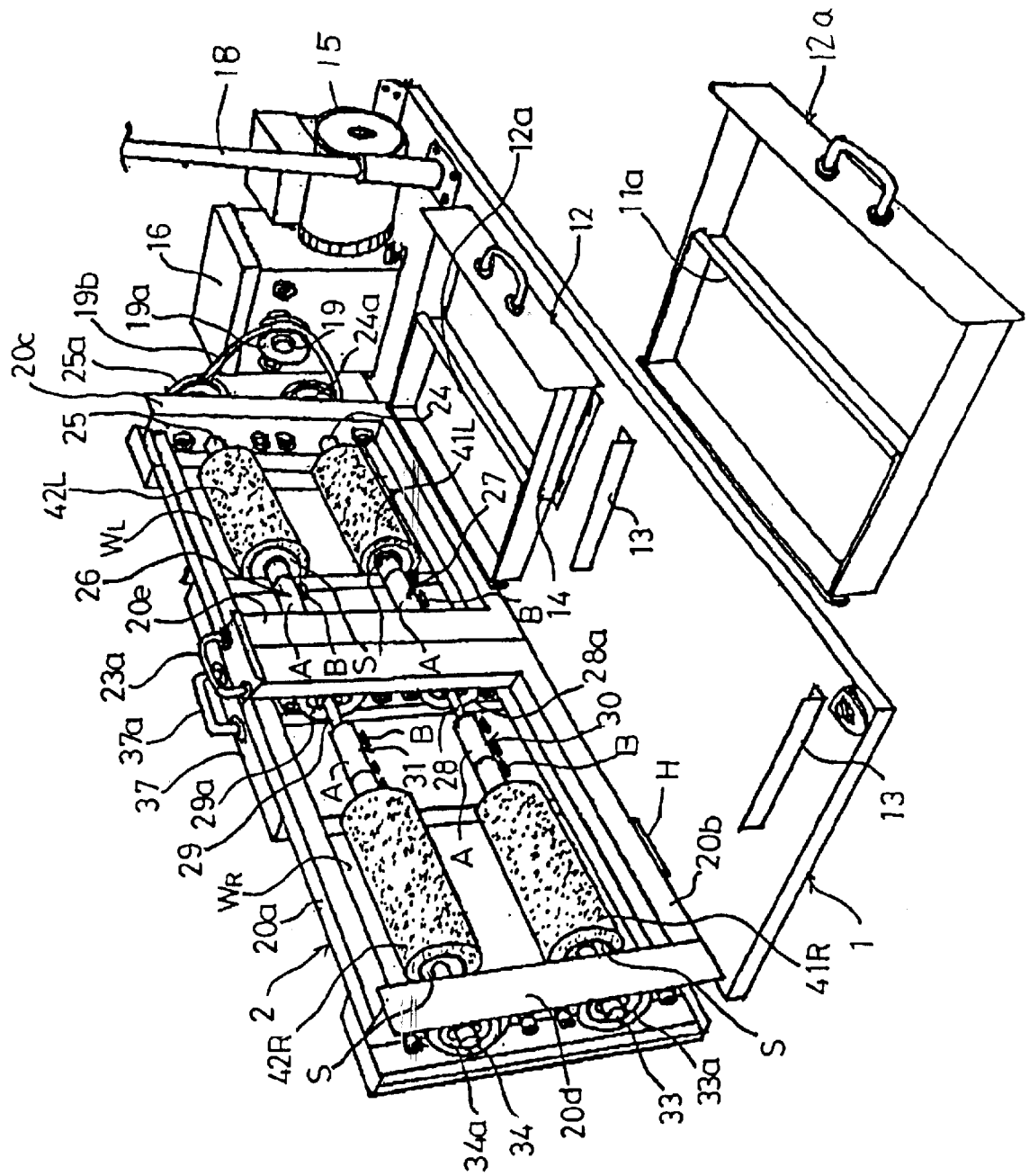
FIG. 2 is a perspective view showing a state in which a machine frame in the same apparatus is turned to open.
Figure 3:
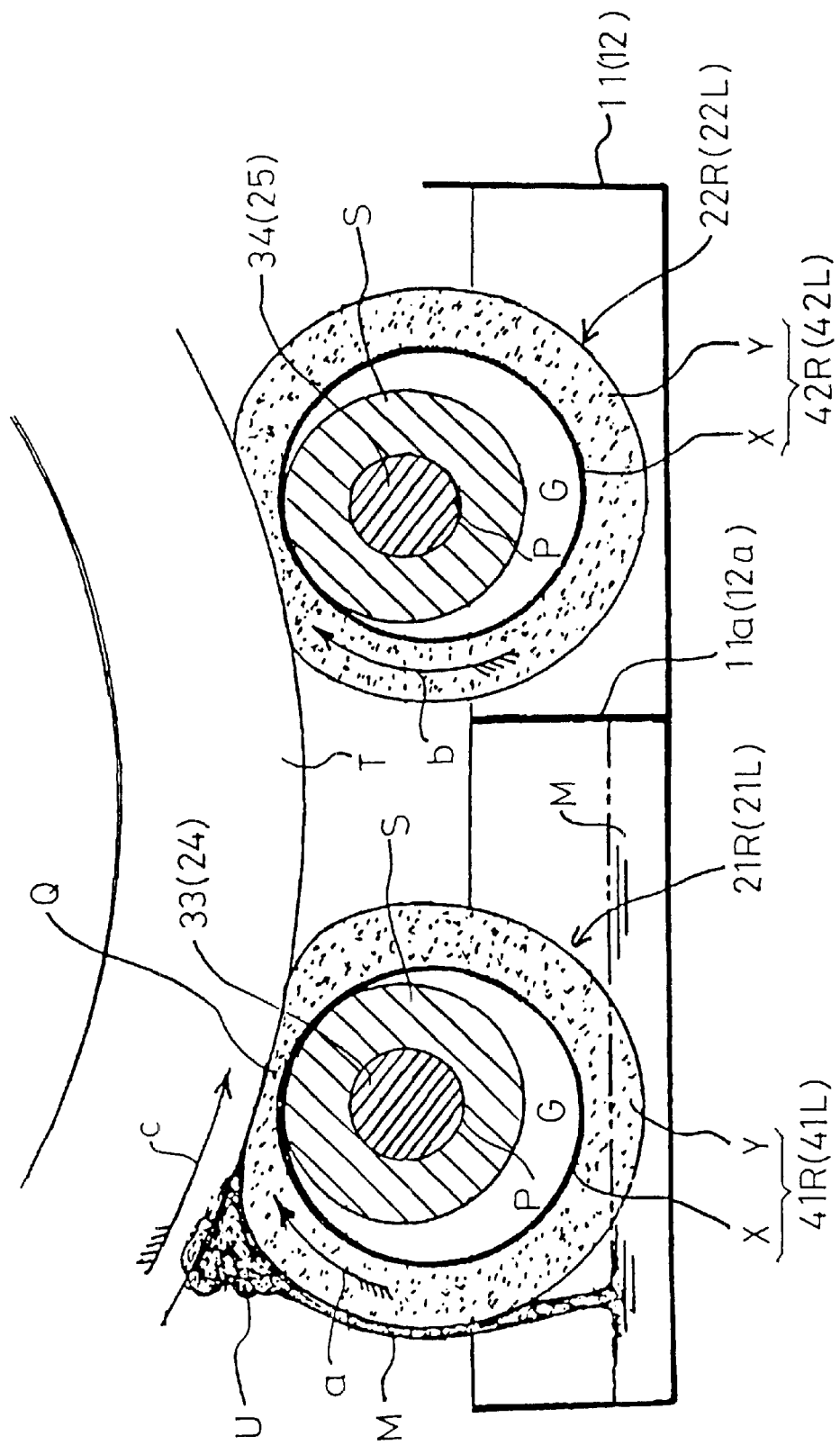
FIG. 3 is a cross-sectional view showing a state of a wheel which is being cleaned by the rollers.

FIG. 1 is an outward perspective view showing a wheel cleaning apparatus for a wheelchair according to an embodiment 1 of the present invention; FIG. 2 is a perspective view showing a state in which a machine frame is turned to be opened in the same apparatus; and FIG. 3 is a cross-sectional view showing a state of a wheel which is being washed by the rollers in the same apparatus.

The wheel cleaning apparatus for a wheelchair of this embodiment has a base plate 1 having a long shape in the transverse direction, a machine frame 2 capable to be turned by means of a pair of hinges H using the long side of the base plate 1 as the turning center line, and four slope plates 3a–3d.

On the base plate 1, side edge guiding frames 13 and 14 for guiding right and left drawers 11 and 12 with handles are arranged adjacent to each other and fixed. The right and left drawers 11 and 12 can be moved in a sliding motion in the horizontal direction. The right and left drawers 11 and 12 accommodate liquid pooling dishes 11a and 12a. On one edge of the base plate 1, a motor 15 and a gear box 16 are mounted and fixed. Between the drawer 12 and the motor 15, a switch stand 18 is mounted to stand. On the top of the switch stand 18, a switch box 17 is mounted. The height of the switch stand 18 can be adjusted to a desired height. The gear box 16 includes a decelerating gear mechanism for reducing the output rotation number of the motor. An output shaft 19 of the motor is extruded to the outside of the box. A driving pulley 19a is fixed to the output shaft 19.

The machine frame 2 is a shaft supporting frame having a top-edge frame 20a and a base-edge frame 20b which form the long sides, a left-edge frame 20c and a right-edge frame 20d which form the short sides, and a partition frame 20e for forming a pair of right and left windows $W_R$ and $W_L$. In the windows $W_R$ and $W_L$, a right roller part R and a left roller part L for simultaneously cleaning the right and the left wheels of the wheelchair are provided. The right roller R and the left roller L have the same construction. Both have a first receiving roller 21R(21L) and a second receiving roller 22R(22L), which can rotate while receiving the wheels on them and which are arranged generally in parallel and facing to each other. The partition frame 20e of the machine frame 2 has a handle 23a. By grasping the handle 23e, the machine frame 2 can be turned to open or close with respect to the base plate 1. To the left-edge frame 20c at the side of the gear box 16 of the machine frame 2, a pair of driven shafts 24 and 25 is supported to be able to rotate by means of a pair of bearings (not shown). To the extruding edges of the pair of driven shafts 24 and 25, a pair of driven pulleys 24a and 25a is fixed. A V belt 19b is wound and hung on the pair of the driven pulleys 24a and 25a and the driving pulley 19a at the side of the gear box 16.

In the window $W_L$, the first and second receiving rollers 21L and 22L fixed to the driven shafts 24 and 25 are accommodated to form the left roller part L. The driven shafts 24 and 25 transmit rotating force to junction shafts 28 and 29 which are supported to be able to rotate by bearings 28a and 29a, which in turn are fixed to the partition frame 20e through couplings 26 and 27. The junction shafts 28 and 29 transmit rotating force to the driven shafts 33 and 34 which are supported to be able to rotate by bearings 33a and 34a, which in turn are fixed to the right-side end frame 20d through couplings 30 and 31. In the window $W_R$, the first and second receiving rollers 21R and 22R fixed to the driven shafts 33 and 34 are accommodated to form the right roller part R.

The first and second receiving rollers 21R(21L) and 22R(22L) have the same construction. That is, the roller has a shape of a column having the length of the circumferential surface of the roller, which is twice as long as the diameter. As shown in FIG. 3, the roller has a larger diameter tube S having a diameter larger than the diameter of the driven shaft 33(24) or 34(25). The roller further has a floating circumscribed tube 41R(41L) or 42R(42L). Through the larger diameter tube S, the driven shaft 33(24) or 34(25) penetrates so that the larger diameter tube S rotates together with driven shaft 33(24) or 34(25). The floating circumscribed tube 41R(41L) or 42R(42L) have an inside diameter larger than the diameter of the larger diameter tube S and is circumscribed with the larger diameter tube S remaining an idle gap G between the floating circumscribed tube and the larger diameter tube S. Each of the floating circumscribed tube S 41R(41L) and 42R(42L) has, in its internal circumference side, a hard-core tube X made of plastics, and, in its outer circumference side, it has a felt-state elastic water-absorbing tube (a tube having properties of elasticity, contraction and liquid absorption) Y made of polyester fiber which is poured with pressure into the hard-core tube X. The lower side of the floating circumscribed tube 41R(41L) of the first receiving roller 21R(21L) is soaked with liquid medicine M in the liquid pooling dish 11a(12a) as shown in FIG. 3. As described later in detail, a wheel Y is washed. To this end, the floating circumscribed tube 41R(41L) functions as a washing tube. The second receiving roller 22R(22L) is not soaked with the liquid medicine M but wipes the washed and wet wheel T, and therefore, functions as a dry wiping tube.

Each driven shaft 33(24) or 34(25) can be moved by means of a pin-pair node (not shown) to tilt with respect to the base edge shaft at the bearing side. Its tip side is coupled to the junction shaft 28 or 29 through the coupling 30(31) or 26(27). The couplings 30(31) and 26(27) have hand touching sleeves A for covering and pressing the shaft coupling portions and setscrews B for fixing the hand touching sleeves A to the shafts. By loosing the setscrew B and by sliding the hand touching sleeve A in the shaft direction, each driven shaft 33(34) or 24(25) can be bent to tilt so that it becomes possible to insert or pull out each floating circumscribed tube 41R(41L) or 42R(42L), resulting in that the convenience in the maintenance and exchange is ensured.

In a state when the machine frame 2 is laid on the base plate 1, the tension of the V belt 19*b* is so set that the V belt 19*b* forms a triangle closed loop and is loosely wound and hung on the pair of driven pulleys 24*a* and 25*a* and the driving pulley 19*a*. Therefore, when a load such as a pressure by a wheelchair or the like is applied to the receiving rollers 21R(21L) and 22R(22L), the machine frame 2 is slightly pressed down. When the machine frame 2 is pressed down, the tension of the V belt 19*b* is increased so that the power is transmitted from the driving pulley 19*a* to the driven pulleys 24*a* and 25*a*. When the wheelchair is not on the machine frame 2 so that there is no load, the tension of the V belt 19*b* is loosened. Therefore, even when a power switch SW in the switch box 17 is turned ON and the motor 15 starts to rotate the driving pulley 19*a*, the driven pulleys 24*a* and 25*a* perform almost no rotation. Accordingly, the driving pulley 19*a*, the driven pulleys 24*a* and 25*a*, and the V belt 19*b* wound on and hung to them constitute an automatic friction clutch mechanism sensitive to load, so that an accident such as a winding accident can be prevented from happening. It may be possible to employ an automatic clutch mechanism equipped with an optical sensor or the like responsible to a placement of wheels, however, this requires new construction members to raise the cost. In contrast, the automatic friction clutch mechanism sensitive to load does not require the particular additional member so that its cost is low. It is preferable to cover the winding and hanging apparatus including the gear box 16 and the motor 15 by a protection cover. It is also preferable to provide a timer control circuit in the switch box 17 so that the motor 15 is driven at a designed time.

Between the right roller part R and the left roller part L of the machine frame 2, a covering lid 37 is provided. The covering lid 37 can be turned by means of the hinge H. A handle 37*a* is attached to the covering lid 37. For example, when the wheelchair is to be dropped off from the downward slope plate, a helper can stand or walk on the covering lid 37. Further, it is possible to grasp the handle 37*a* to open or close the covering lid 37 with respect to the machine frame 2. Therefore, each floating circumscribed tube 41R(41L) or 42R(42L) can be inserted or pulled off without opening the heavy machine frame 2 with respect to the base plate 1, saving the trouble in the maintenance of the apparatus and in the exchange of parts. It should be noted that, to enable to walk on the roller parts R and L, it might be possible to provide a covering flap, which is opened or closed by means of a leg.

Each of the slope plates 3*a*–3*d* includes a standing side edge piece K which bridges between the floor surface F and the top end of the top-edge frame 20*a* and between the floor surface F and the base-edge frame 20*b*. Therefore, both of the slope plates can be used either as an upward slope for the wheelchair to get into the apparatus or as a downward slope for the wheelchair to escape from the apparatus.

When the wheels of the wheelchair are to be cleaned, at first, the two wheels of the wheelchair are moved along the slope plates 3*a* and 3*c* so that the front wheels or the rear wheels are on the right roller part R and the left roller part L. When each of the right and the left wheels is on both of the floating circumscribed tube S 41R(41L) and 42R(42L) to contact them, the machine frame 2 slightly goes down due to the load of the wheelchair. As a result, the driven pulleys 24*a* and 25 go down to make displacements so that the tension of the V belt 19*b* is increased to operate the clutch to realize a state in which power transmission is possible. It may be possible that only the wheelchair without any person is on the roller parts R and L, or the wheelchair with a person to be helped is on the roller parts R and L.

When a helper or the like turns ON the power switch SW in the switch box 17, the motor 14 starts to operate so that the rotating force is transmitted through the V belt 19*b* to the driven shaft 24(25), the junction shaft 28(29) and the driven shaft 33(34). Thus the larger diameter tube S of the first and second receiving rollers 21R(21L) and 22R(22L) rotate. The upper parts of the internal circumference surfaces of the hard core tubes X of the floating circumscribed tubs 41R(41L) and 42R(42L) are in contact with a pressure with the larger diameter tubes S. Therefore, by friction transmission of the power, the floating circumscribed tubes 41R(41L) and 42R(42L) rotate in the directions indicated by arrows a and b in FIG. 3 with their virtual shaft core P as their approximate centers. Thus, the left and right wheels T, which are pushed to contact the upper portions of the periphery of the elastic water-absorbing tube Y, are synchronously rotated in the directions indicated by an arrow c by the friction transmission of the power. Since the diameter of the roller is considerably smaller than the diameter of the wheel T, the wheel T rotates relatively slowly. The front wheels of a wheelchair are usually swivel wheels. Therefore, when the wheels are in contact with the Pair of the floating circumscribed tubes 41R(41L) and 42R(42L), the wheels start to rotate without zigzag movement but the wheel shafts of the swivel wheels are naturally arranged in parallel to the shaft lines of the roller parts.

The lower part of the floating circumscribed tube 41R (41L) is sunk in the liquid medicine (washing liquid) M in the liquid pooling dish 11*a*(12*a*). Therefore, the lower part of the elastic water-absorbing tube Y is sunk in the liquid medicine M to be wet and expanded. The wet and expanded portion is then separated from the liquid medicine M to the upper part of the liquid surface and, at the upper part, the wet and expanded portion contacts with and pushes against the lower end portion of the wheel T. Thus the wet and expanded portion contracts by pressure so that the liquid medicine M is squeezed out form the upper compressed part Q. As a result, a liquid puddle (liquid cut part) U is automatically generated in the narrow gap between the elastic water-absorbing tube Y and the wheel T. Each portion of the elastic water-absorbing tube Y when it is at the lower end side is soaked into the liquid medicine M to absorb the liquid medicine M, and then rotates to raise the lower end side to transport the liquid medicine, and finally the liquid medicine is gushed out from the upper end portion by pressure. Thereby the wheel T is driven to rotate while the grounding surface side of is soaked in the liquid puddle U so that the grounding surface is washed by the nozzle-type washing which accompanies with vibration. Immediately after wetting the grounding surface of the wheel T by the liquid puddle U, the grounding surface is wrapped by the upper compressed part Q to receive a friction and a sliding accompanying small slips. Therefore, this wheel washing realizes an automatic, uniform and high washing efficiency. The amount of the liquid in the liquid puddle U is determined by the ratio between the diameter of the wheel and that of the roller, the rotating speed, the surface tension, etc. Almost no liquid medicine M squeezed out from the upper compressed part Q is transported to the narrow gap between the elastic water-absorbing tube Y and the wheel T at the contact end side because, the liquid medicine M squeezed out from the upper compressed part Q returns through the liquid puddle U and the surface of the elastic water-absorbing tube Y to the liquid pool dish 11*a*(12*a*). When a position of the elastic water-absorbing tube Y passes over the maximum pressure position, the elastic water-absorbing tube Y at that position is expanded to recover its shape due to its elasticity. Therefore, a portion between the maximum pressure position and the contact end position absorbs the liquid medicine M that has wet the grounding surface of the wheel T to wipe away. Thus, the first receiving roller 21R(21L) has not only the nozzle-type washing function but also a wiping-away function to remove the wet characteristic. Further, on the second receiving roller 22R(22L), since the wheel T frictionally contacts with the dry elastic water-absorbing tube Y, the wet characteristic of the grounding surface of the wheel can be removed at a high efficiency.

In this embodiment, between the internal circumference surface and the internal circumference surface, there is an idle gap (space) G having a crescent shape when viewed from the side. Because of the presence of this idle gap G, the floating circumscribed tube 41R(41L) or 42R(42L) can stop to rotate under a certain condition while the diameter expanding shaft portion S is rotating because of a low friction with the hard-core tube X. That is, when a hand or a leg contacts with either one of the floating circumscribed tube 41R(41L) or 42R(42L) which is rotating together with the diameter expanding portion S during the operation of the apparatus, a small restriction force is applied to the floating circumscribed tube 41R(41L) or 42R(42L). As a result, the floating circumscribed tube will circumferentially slide on the surface of the hard-core tube X to stop its rotation even when the diameter expanding shaft portion S is rotating. Accompanied by this stop of rotation of the floating circumscribed tube, the rotation of the wheel T and accordingly the rotation of the other floating circumscribed tube are stopped, resulting in that an accident such as a winding accident can be prevented from happening.

Figure 4:
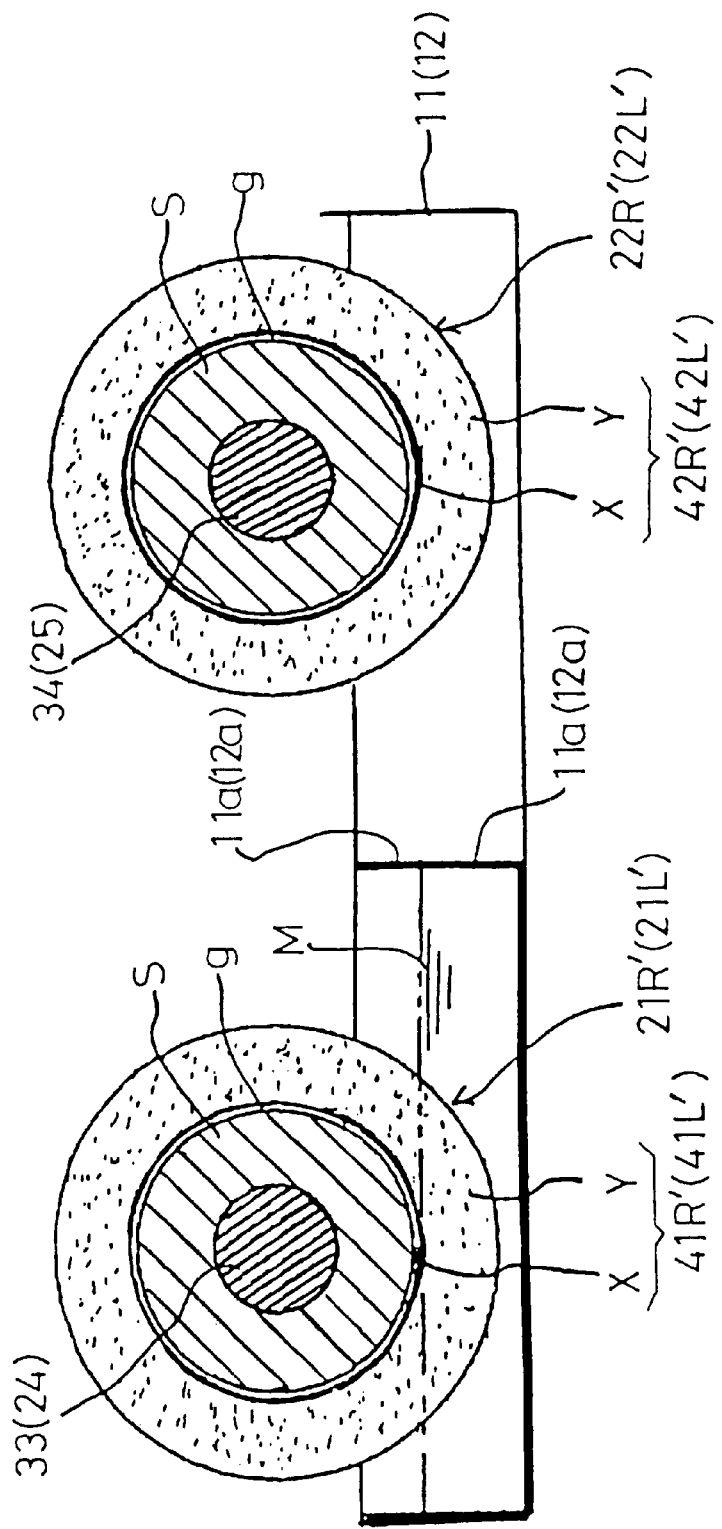
FIG. 4 is a cross-sectional view showing another construction of a roller in the same apparatus.

Alternative to the idle gap G having a crescent shape when viewed from the side, an idle gap g as shown in FIG. 4 may also be employed. The idle gap g is a fitting tolerance nearly equal to a clearance fit. The idle gap g also make it possible for the floating circumscribed tube 41R' (41L') or 42R' (42L') to circumferentially slide on the surface of the hard-core tube X.

The liquid medicine M is expendable supply. Taking bother in supplying the liquid medicine M into consideration, it is desired to keep the liquid medicine M as much as possible. To keep the lower side of the elastic water-absorbing tube Y to be soaked in the liquid medicine M for a long time, it must be necessary to make the floating circumscribed tube to have a large diameter and the liquid pool dish 11a(12a) to have a long depth. In the roller part shown in FIG. 4, however, if the floating circumscribed tube 41R' (41L') or 42R' (42L') is made to have a large diameter, the larger diameter tube S must be positioned at a higher place in order to avoid an interference between the shaft of the larger diameter tube S and the liquid Pool dish 11a(12a). This naturally causes the level of the upper end portion to be higher so that it becomes impossible to make the apparatus to be thin. If the slope plates 3a–3e are made long, the installation area is increased so that it becomes difficult to install the apparatus on the front or the like.

Therefore, it is preferable to employ the roller part as shown in FIG. 3 in which the floating circumscribed tube 41R(42R) or 42R(42L) has a virtual shaft center P at a position lower than the central axis of the diameter expanding portion S. If an automatic liquid medicine supplying apparatus (an apparatus for keeping the height of the liquid surface to be constant) is included, or if the machine frame 2 is constructed to be embedded under the floor surface, however, the roller part as shown in FIG. 4 can be employed. When a person to be helped is riding on the wheelchair, it is not necessary for the floating circumscribed tube 41R(41L) or 42R(42L) to slip while the larger diameter tube S is rotating, but the floating circumscribed tube may rotate together with the larger diameter tube S. It should be noted, however, that the roller part shown in FIG. 3 has always the idle gap G having a crescent shape so that the outer surface of the diameter expanding part and the internal surface of the floating circumscribed tube are soaked in the liquid medicine M. Therefore, the gravel in the idle gap G can be washed away. As a result, friction between the attached gravel and the hard-core tube X can be avoided at the upper portion so that the hard-core tube X can be prevented from being damaged.

Since the liquid pool dish 11a(12a) is accommodated into the drawer 11 or 12, it is possible to get the drawer in and out of the liquid pool dish without turning the relatively heavy machine frame 2. As a result, it is convenient to clean the liquid pool dish 11a(12a) or to supply the liquid medicine M.

The liquid pool dish 11a(12a) has both a function to supply the washing liquid to the lower side of the floating circumscribed tube and a liquid receiving function to collect the washing liquid. Alternatively, it may also be possible to construct the washing liquid attaching means for getting the lower side of the floating circumscribed tube wet and the liquid receiving means for collecting the washing liquid as separate bodies. It should be noted, however, that the elastic water-absorbing tube of the floating circumscribed tube is made of self-water-absorbing material, and therefore, it is desired to employ washing liquid attaching means having a self water-absorbing speed coping with the rotation speed. To increase the self water-absorbing speed, it may also be possible to provide a liquid sucking pressure roller for pressing to and contacting with the lower side of the elastic water-absorbing tube so as to attach the washing liquid to the lower side of the elastic water-absorbing tube while it is expanding and restored.

(Embodiment 2)

Figure 5:
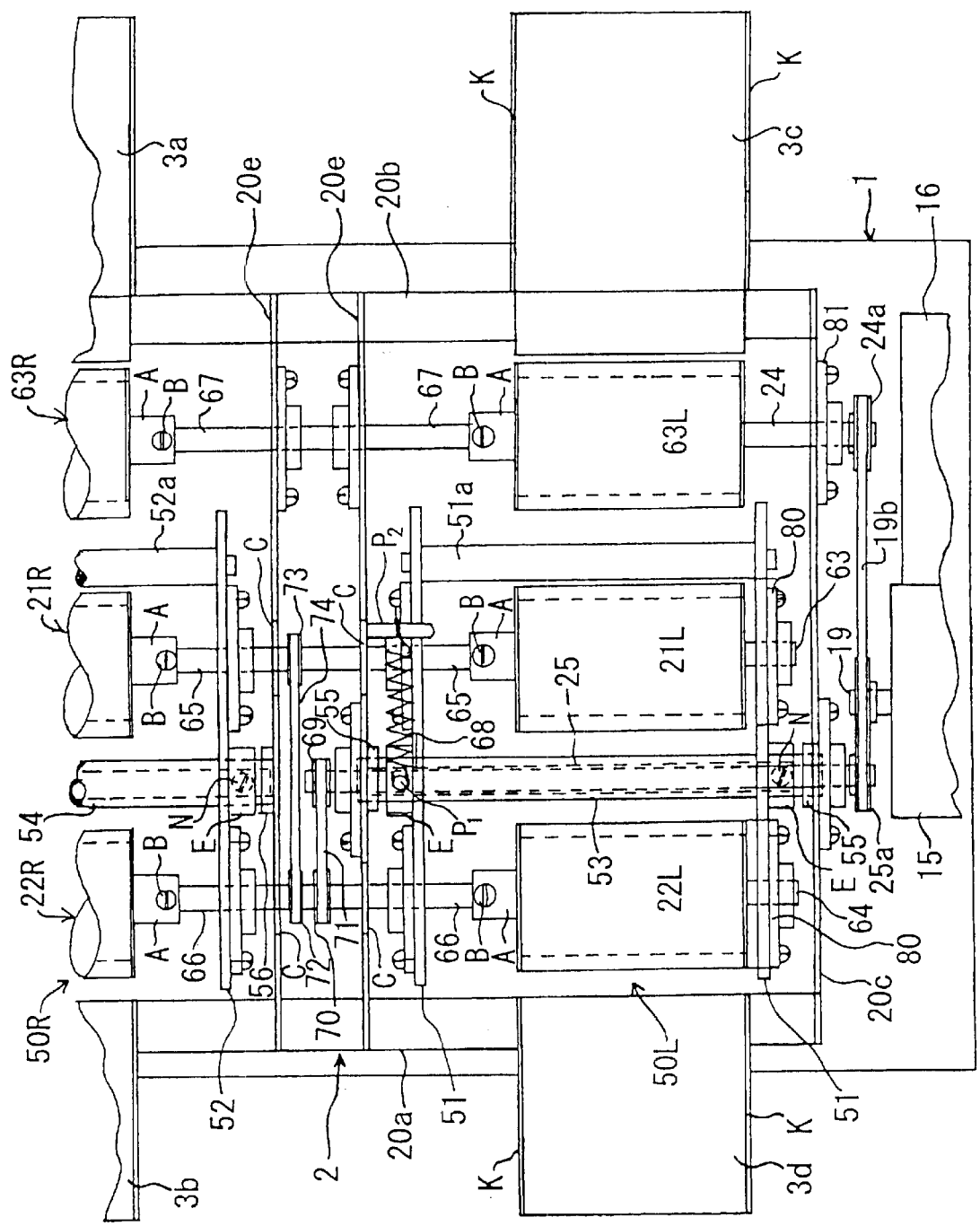
FIG. 5 is a partial plan view showing a wheel cleaning apparatus for a wheelchair according to a second embodiment of the present invention.
Figure 6:
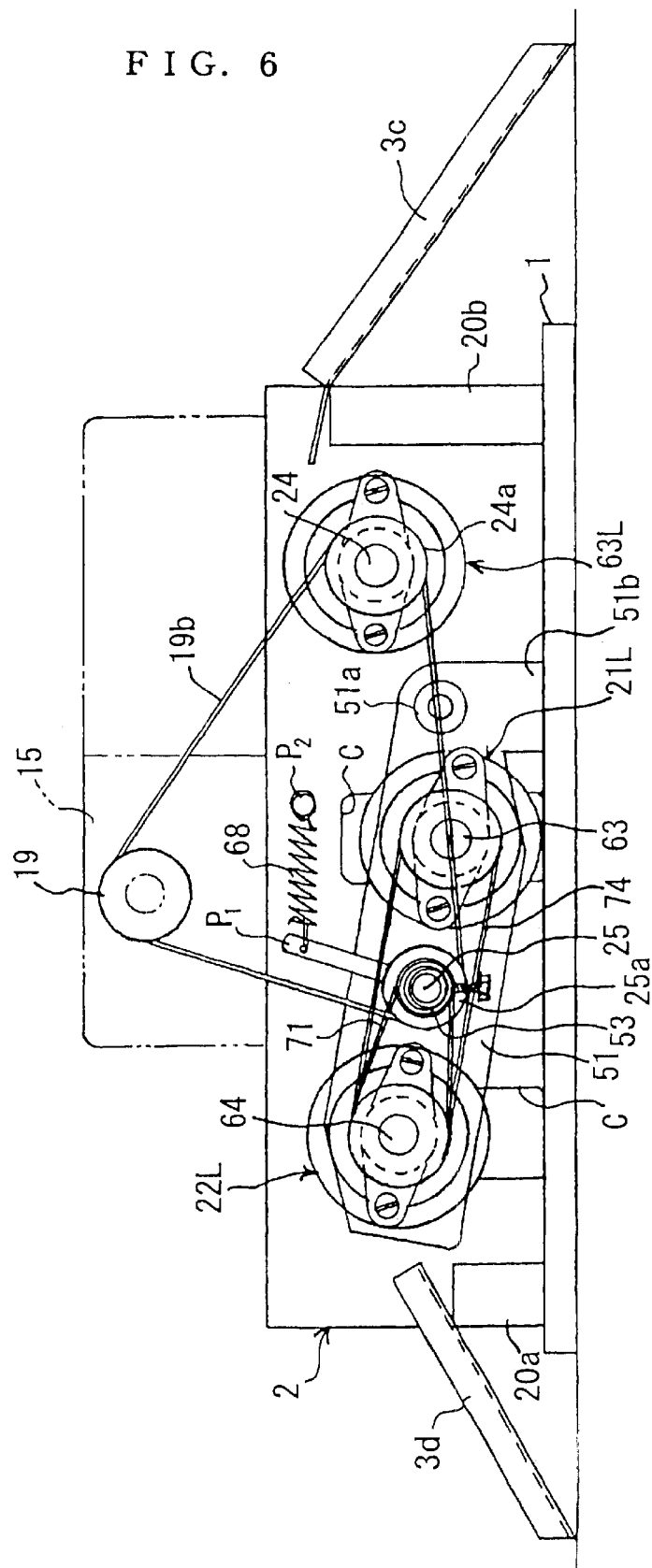
FIG. 6 is a side view showing a roller part when the apparatus is not loading the wheelchair.
Figure 7:
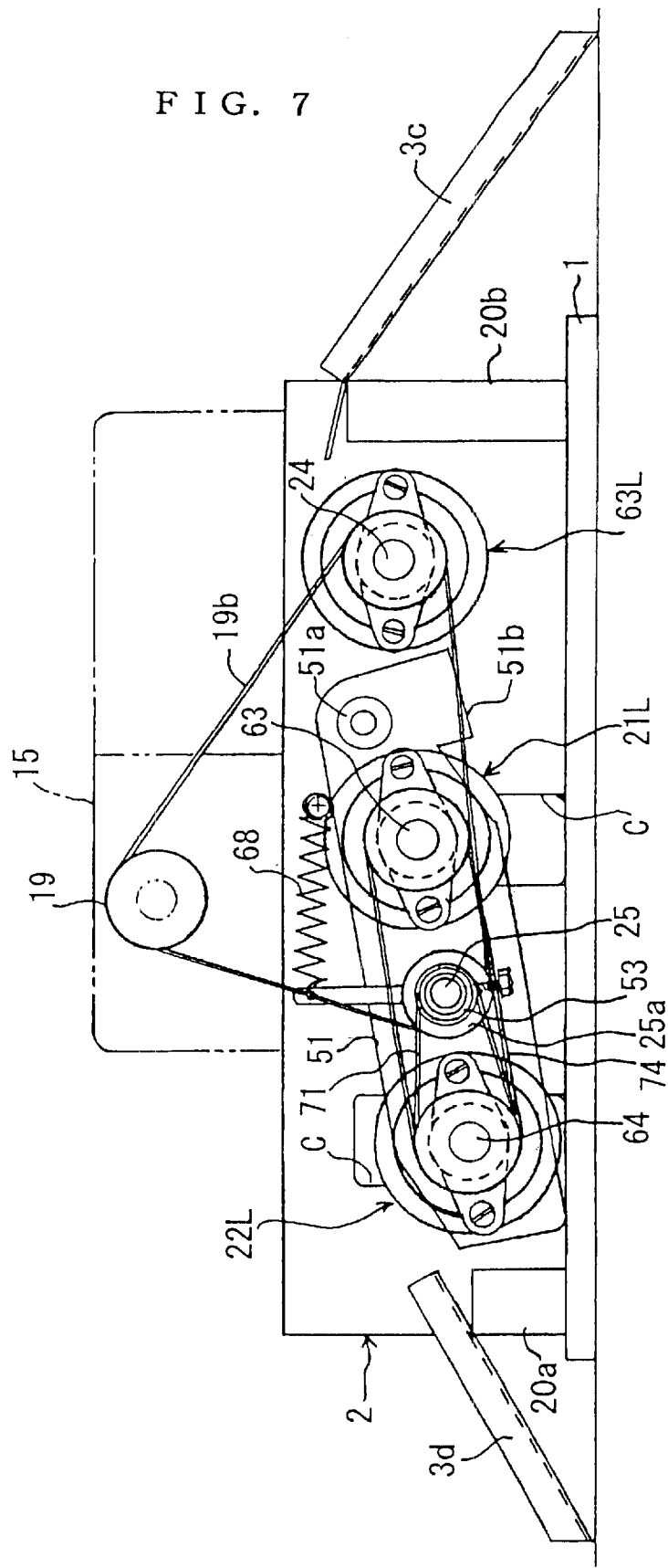
FIG. 7 is a side view showing a roller part when the apparatus is loading the wheelchair.

FIG. 5 is a partial plan view showing a wheel cleaning apparatus for a wheelchair according to a second embodiment of the present invention; FIG. 6 is a side view showing a roller part when the same apparatus is not loading the wheelchair; and FIG. 7 is a side view showing the roller part when the same apparatus is loading the wheelchair. In this embodiment, the same parts as those shown in FIGS. 1–4 are denoted by the same reference symbols, and the explanations thereof are omitted here.

The outer construction of the wheel cleaning apparatus for a wheelchair according to this embodiment is almost the same as that in the first embodiment, and has a base plate 1 having a long shape in the transverse direction, a machine frame 2 capable to be turned by means of a pair of hinges H using the long side of the base plate 1 as the turning center line, and four slope plates 3a–3d. In this embodiment also, the construction of the right roller part R and the construction of the left roller part L are the same. The left roller part L at the side of the motor 15 is arranged in a rectangular area enclosed by a left-side edge frame 20c, one of the partition frames 20e, a top-edge frame 20a and a base-edge frame 20b of the machine frame 2. A right roller part R is arranged in a rectangular area enclosed by a right-edge frame 20d, the other of the partition frames 20e, the top-edge frame 20a and the base-edge frame 20b. This embodiment is characterized in that three receiving rollers are arranged in each roller part.

Each roller part R(L) has a roller-assembly frame 50R (50L). The roller-assembly frame 50R(50L) includes a first receiving roller 21R(21L) and a second receiving roller 22R(22L) which can rotate while receiving the wheels on them and which are arranged generally in parallel and facing to each other. The roller-assembly frame 50R(50L) further includes a third receiving roller 63R(63L). The left roller-assembly frame 50 L has a pair of supporting plates 51 and 51 for supporting rotary shafts 63 and 64 and junction shafts 65 and 66 connected by hand touching sleeves A, a turning center shaft tube 53 the both ends of which are fixed by means of fixing rings E and screws N, and a fall preventing rod 51a the both ends of which are fixed to the supporting plates 51 and 51. The right roller-assembly frame 50R has a pair of supporting plates 52 and 52 for supporting rotary shafts (not shown in the figure) and junction shafts 65 and 66 connected by hand touching sleeves A, a turning center shaft tube 54 the both ends of which are fixed by means of fixing rings E and screws N, and a fall preventing rod 52a the both ends of which are fixed to the supporting plates 52 and 52.

The left roller-assembly frame 50L is supported by means of the left-side edge frame 20c and one of the partition frames 20e in such a way that it can swing. Similarly, the right roller-assembly frame 50R is supported by means of the left-side edge frame 20c and the other one of the partition frames 20e in such a way that it can swing. That is, both ends of the turning center shaft tube 53 in the left roller-assembly frame 50L are supported to be able to rotate by means of supporting rings 55 fitted to the supporting plates 51 and 51. Similarly, both ends of the turning center shaft tube 54 in the right roller-assembly frame 50R are supported to be able to rotate by means of supporting rings 56 fitted to the supporting plates 52 and 52. The junction shafts 65 and 66 connect the both roller-assembly frames 50L and 50R through notches C of the partition frames 20e and 20e. Both roller-assembly frames 50L and 50R are energized by elasticity in a direction to lower the first receiving rollers 21L and 21R, by means of a restoring coil spring 68 which is hanged by and fixed to a pin $P_1$ on the fixed ring E and a pin $P_2$ on a position of one of the partition frames 20e closer to the first receiving roller 21L. Accordingly, in a no load state, as shown in FIG. 6, the stopper portions 51b on the supporting plates 51 and 52 of both roller-assembly frames 50L and 50R are in contact with the base plate 1.

A third receiving roller 63L in the left roller part L is associated by a shaft with the left-side end frame 20c and one of the partition frames 20e, and is attached to a driven shaft 24 and a junction shaft 67 which are connected by a hand touching sleeve A. Similarly, a third receiving roller 63R in the right roller part R is associated by a shaft with the right-side end frame 20d and the other one of the partition frames 20e, and is attached to a driven shaft 29 and a junction shaft 67 which are connected by a hand touching sleeve A.

The driving force from the motor 15 is transmitted through the V belt 19b and the driven pulley 24a to the driven shaft 24, the junction shaft 67 and the driven shaft 29 so that the third receiving rollers 63L and 63R rotate synchronously. On the other hand, the driven shaft 25 of the driven pulley 25a penetrates through the turning center shaft tube 53 and the tip of the driven shaft 25 reaches a space between the partition frames 20e and 20e. Between a sprocket 69 attached to the tip and a sprocket 70 attached to the junction shaft 66, a first roller chain 71 is wounded and hanged. Similarly, between sprockets 72 attached adjacent to the sprocket 70 to the junction shaft 65 and a sprocket 73 attached to the junction shaft 65, a second roller chain 74 is wounded and hanged. These winding and hanging apparatus constitute a power distributing apparatus for distributing power from the driven shaft 25 to the junction shafts 65 and 66.

Figure 8:
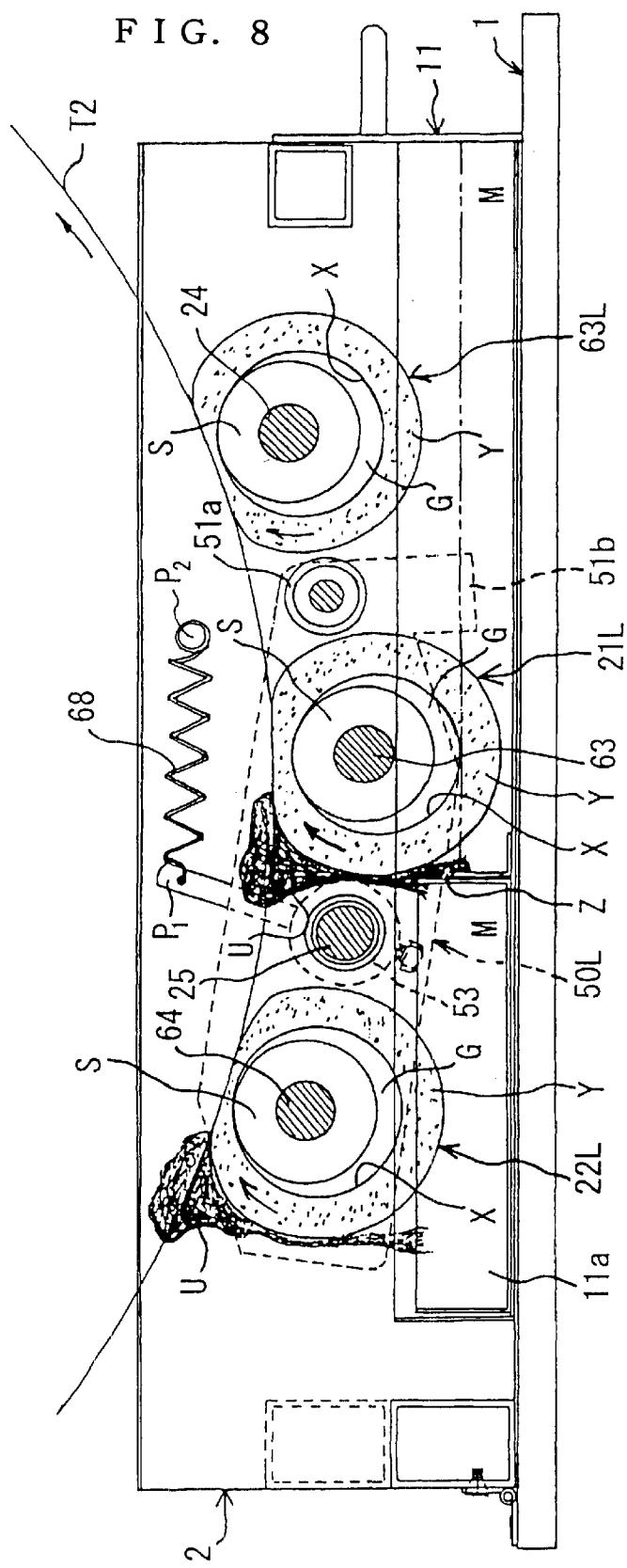
FIG. 8 is a side view showing a state when a rear wheel is being washed in the apparatus comprises.

The construction of the receiving roller in this embodiment is the same as the construction in the first embodiment. That is, as shown in FIG. 8, the receiving roller has a hard-core tube X with an idle gap G at its lower side and which contacts with a diameter expanding portion S at its upper side, and an elastic water-absorbing tube Y fitted to the hard-core tube X. Similar to the first embodiment, on the base plate 1, drawers 11 and 12 with right and left handles and accommodating liquid pool dishes 11a ands 12a are provided. The liquid pool dishes 11a and 12a are arranged just under the second receiving rollers 22R and 22L. The vessel wall Z of the dish is close to or in contact with the moving-upward outer surface of the first receiving rollers 21R and 21L. Washing liquid M is filled not only in the liquid pool dishes 11a and 12a but also in the drawers 11 and 12 so that the lower sides of the first receiving rollers 23R and 21L are soaked in the washing liquid.

First of all, as shown in FIG. 9A, a front wheel T1 of a wheelchair is pushed up on the slope plate 3c and, when the front wheel T1 of the wheelchair has climbed over the third receiving roller 63L, the front wheel T1 becomes once stable at the place between the third receiving roller 63L and the first receiving roller 21L. At this place, the lower side of the first receiving roller 21L is soaked in the washing liquid so that the front wheel T1 is washed in the same way as in the first embodiment, and in addition, since the third receiving roller 63L is at a higher position so that its lower side does not soak in the washing liquid, the wet layer of the washed front wheel T1 is wiped. Note that, since there is the fall preventing rod 51a in a narrow gap between the first receiving roller 21L and the third receiving roller 63L, the front wheel T1 is prevented from being fallen into the gap even when their diameters are small.

At this position, since the first receiving roller 21L is pushed down, the front wheel T1 can easily climb over the first receiving roller 21L without strongly pushing the wheelchair so that the front wheel T1 moves to a place between the first receiving roller 21L and the second receiving roller 22L as shown by an alternate long and two short dashes line. Thus the position of the load on the roller-assembly frame 50L moves so that, as shown in FIG. 9A, the roller-assembly frame 50L turns against the energizing force by the restoring coil spring 68 to push down the second receiving roller 22L. When the pushing force is weak or when the spring force of the restoring coil spring 68 is strong, the front wheel T1 will stay at a place between the first receiving roller 21L and the second receiving roller 22L so that the front wheel T1 is washed by the first receiving roller 21. In contrast, when the pushing force is strong or when the spring force of the restoring coil spring 68 is weak, the function of spring up of the first receiving roller 21L and pushing the front wheel T1 by the first receiving roller 21L causes the front wheel T1 to escape from the second receiving roller 22L to a place on the slope plate 3d.

Accordingly, by the seesaw movement of the roller-assembly frame 50L, the front wheel can escape form the second receiving roller 22L very easily. At the time of the escape of the front wheel, the second receiving roller 22L is pushed down so that the difference in height between the second receiving roller 22L and the floor at the escaping side can be made small. As a result, the length of the slope plate 3d at the escaping side can be made shorter than the length of the slope plate 3c at the side where the wheelchair gets into, so that the installation space can be reduced. Further, when the first receiving roller 21 springs up, the fall preventing rod 51a also springs up. This prevents a tip of a toe of a person from fitting into the narrow gap between the first receiving roller 21L and the second receiving roller 22L to ensure the safety. It should be noted that, after the front wheel T1 escapes, the state of the roller-assembly frame 50L returns to the state shown in FIG. 9A by means of the restoring coil spring 68.

Next, as shown in FIG. 10A, when the rear wheel T2 of the wheelchair is pushed up to the slope plate 3c to climb over the third receiving roller 63L, most of the load of the wheelchair is applied on the rear wheel T2, and in addition, since the diameter of the real wheel T2 is large, the rear wheel T2 contacts with three points, i.e., the third receiving roller 63, the first receiving roller 21L and the second receiving roller 22L. In this state, the load of the wheel chair on the roller-assembly frame 50L and the elastic energizing force applied to the roller-assembly frame 50L by the restoring coil spring 68 are balanced so that the roller-assembly frame 50L is stable in a seesaw movement. The rear wheel T2 is washed by the first receiving roller 21L and the second receiving roller 22L. Then, the real wheel T2 is wiped by the third receiving roller 63L. Thus, the cleaning effect of the real wheel T2 can be greatly improved. In addition, during cleaning of the rear wheel, the rear wheel is stable in a state in which the rear wheel is in contact with the three rollers by the restoring coil spring. Further the angle of the contacting points to see the center of the rear wheel T2 is large. Therefore, the rear wheel is prevented from slipping off.

Since the upper end of the wall Z of the liquid pool dish 11a contacts with the moving-upward outer surface of the of the first receiving rollers 21L, a part of washing liquid from the liquid puddle U falls through the wall Z into the liquid pool dish 11a. Therefore, the washing liquid M in the drawer 11 is supplied to the liquid pool dish 11a. When the liquid pool dish 11a is filled with the washing liquid M, the overflowed washing liquid is returned back to the drawer 11. Thus, by such a circulating system of the washing liquid M, once the drawer 11 is filled with the washing liquid, double washings can be continued until all of the washing liquid M is consumed. Therefore, the bother in adding the washing liquid M by pouring can be reduced, and the time necessary to wash the wheels can be shortened. It should be noted that, since the liquid pool dish 11a is always full of the washing liquid M, the liquid pool dish 11a does not float up due to the washing liquid M in the drawer 11.

After this washing of the wheels, when the wheelchair is further pushed out, the center of gravity moves to turn the roller-assembly frame 50L as shown in FIG. 10B. As a result, the real wheel T2 escapes from the second receiving roller 22L to the slope plate 3d by the function of spring up and backing of the first receiving roller 21L and by pushing down of the second receiving roller 22L. Therefore, it is very easy for the rear wheel to escape also.

As shown in FIG. 8, the upper end of the liquid pool dish 11a is lower than the upper en of the drawer 11. Therefore, at an intermediate time after filling the washing liquid, the liquid pool dish 11a is full of the washing liquid because of the above-mentioned transportation of the liquid, but the drawer 11 is going to be dried up with the washing liquid M. Therefore, the soaking of the lower end of the second receiving roller 22L tends to be insufficient so that the durability of the double washings tends to be spoiled.

To avoid the above problems, it is desired to make the upper end of the liquid pool dish 11a to be higher than the upper end of the drawer 11. If the drawer 11 is made to have a large depth, the drawer may interact with the driving mechanism. Therefore, it is difficult to increase the amount of pooled liquid in the drawer 11. In contrast, since the liquid pool dish 11a is placed immediately below the first receiving roller 22L, the upper end of the liquid pool dish 11a can be made as high as possible so that the amount of pooled liquid in the liquid pool dish 11a can be increased. Thus, the durability of the double washings can be increased by this increased amount.

Figure 13A:
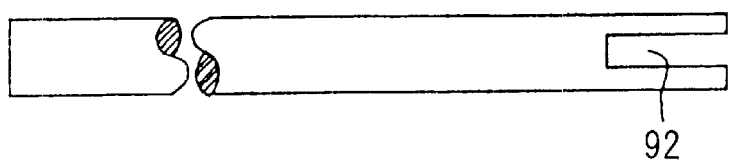
FIG. 13A is a front view showing a joint shaft in the same apparatus.
Figure 13B:
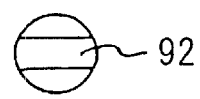
FIG. 13B is a side view showing the joint shaft.
Figure 13C:
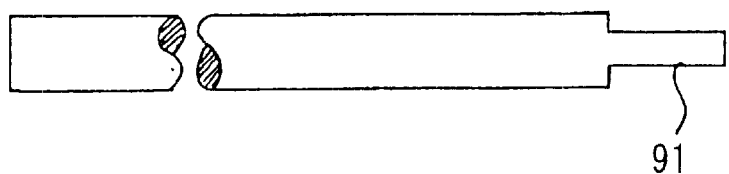
FIG. 13C is a front view showing a rotating shaft and a driven shaft in the same apparatus.
Figure 13D:
FIG. 13D is a side view of the rotating shaft and the driven shaft.
Figure 14A:
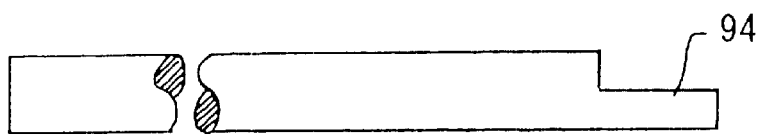
FIG. 14A is a front view showing a joint shaft of another example in the same apparatus.
Figure 14B:
FIG. 14B is a side view of the joint shaft shown in FIG. 14A.
Figure 14C:
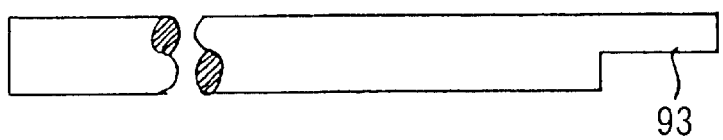
FIG. 14C is a front view showing a rotating shaft and a driven shaft of another examples in the same apparatus.
Figure 14D:
FIG. 14D is a side view of the rotating shaft and the driven shaft shown in FIG. 14C.

As shown in FIG. 5, one end of each of the rotary shafts 63 and 64 of the left roller-assembly frame 50L is supported by a ball bearing 80, which can be moved to be tilt with respect to the supporting plate 51, so as to be able to rotate. Similarly, one end of the driven shaft 24 is supported by a ball bearing 81, which can be moved to be tilt with respect to the left-side edge frame 20c, so as to be able to rotate. Further, the other ends of the rotary shafts 63 and 64 and the driven shaft 24 have insertion pieces 91 as shown in FIGS. 9C and 9D, and one ends of the junction shafts 65, 66 and 67 have expanding slots 92 as shown in FIGS. 13A and 13B, so that the connecting ends are formed as mutually inserting-type ends. The shapes of the mutually inserting-type ends are not restricted to those shown in FIGS. 3A–3D, but may be the shapes as those shown in FIGS. 14A–14D. That is, the other ends of the rotary shafts 63 and 64 and the driven shaft 24 each may have a half cylindrical shape 94 as shown in FIGS. 14C and 14D, and the one ends of the junction shafts 65, 66 and 67 each may have a half cylindrical shape as shown in FIGS. 14A and 14. It should be noted that the structure of the rotary shafts and the driven shaft in the right assembling frame 50R is the same as that in the left assembling frame 50L.

Figure 15:
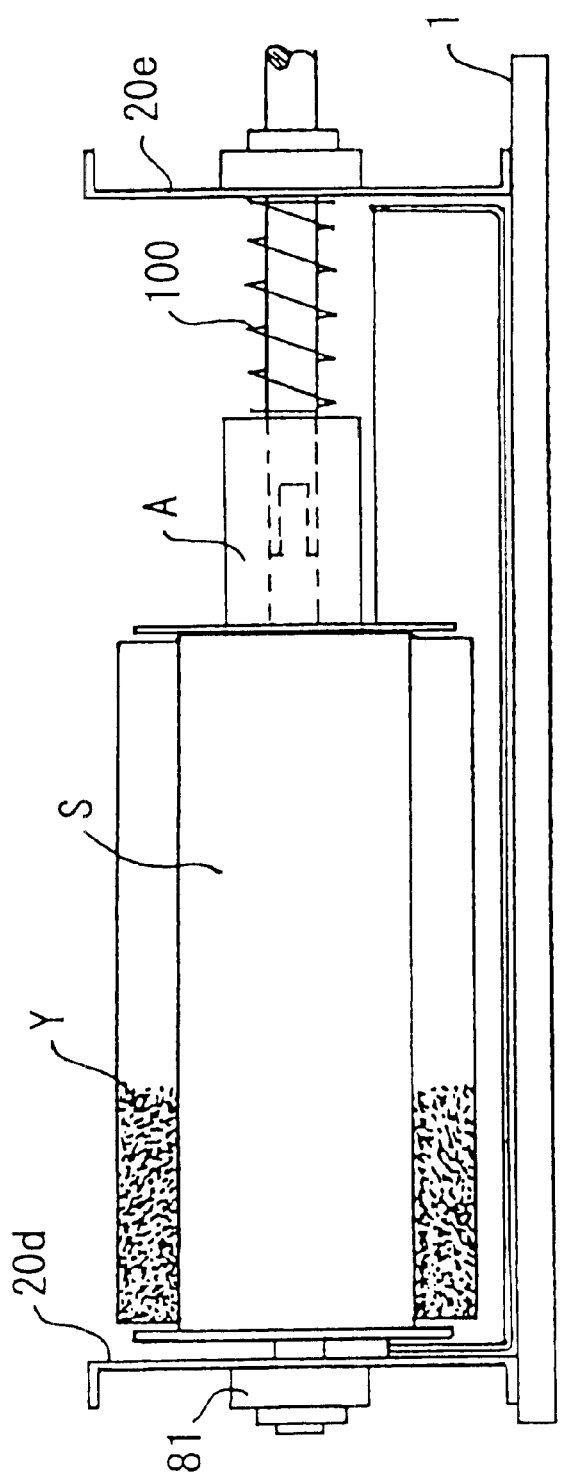
FIG. 15 is a front view showing a fitting structure of a receiving roller of another example in the same apparatus.

For example, when the hard-core tube X and the elastic water-absorbing tube Y of the third receiving roller 63R in the right roller-assembly frame 50R are to be removed from the diameter expanding shaft portion S, the setscrew (fly screw) B is loosened as shown in FIG. 12A, and then, the hand touching sleeve A is made to slide in a direction of the junction shaft 67 as shown in FIG. 12B, whereby the mutually inserting-type ends can be separated. Thus, by moving the rotary shaft 28 to tilt, the hard-core tube X and the elastic water-absorbing tube Y can be pulled out from the diameter expanding shaft portion S. Therefore, the exchange of the elastic water-absorbing tube Y is easy. It should be noted that, in stead of using the setscrew B, it may be possible to employ a push and stop coil spring 100 as shown in FIG. 15 for pushing the hand touching sleeve A to the roller side to fix it.

As has been described above, the wheel cleaning apparatus for a wheelchair according to the present invention is characterized by comprising rocking and supporting mechanism for supporting a roller-assembly frame having first and second receiving rollers in such a way that the roller assembling mechanism can rock in the positive and negative directions with respect to the central axis of the rocking, and energizing means for energizing the roller-assembly frame in such a way that the second roller springs up from the first receiving roller. Therefore, when the wheels are to escape, the roller-assembly frame rocks to push the front wheels, resulting in that the front wheels can easily be separated from a place between the receiving rollers. Also during cleaning the real wheels, the wheels are prevented from slipping off so that the load of the helper can be reduced.

Further, since the receiving rollers perform a washing function and a wiping function, the wheels can be automatically washed and wiped without forcing the helper to do cleaning work so that the dirt on the wheels can be removed at a high reliability.

What is claimed is:

1. A wheel cleaning apparatus for a device having wheels comprising:
   a roller-assembly frame including first and second receiving rollers which can rotate while receiving at least one of said wheels, said first and second receiving rollers being almost parallel and arranged facing each other;
   roller driving means driving the rotation of at least one of said first and second receiving rollers;
   cleaning means cleaning said wheels which are driven to rotate on said first and second receiving rollers;
   a rocking and supporting mechanism supporting said roller-assembly frame in such a way that said roller assembly frame can rock in a positive and negative directions with respect to a central axis of the rocking; and
   energizing means energizing said roller-assembly frame in a direction to spring up said second receiving roller from said first receiving roller, wherein said energizing means is an elastic means.

2. The wheel cleaning apparatus for a wheelchair according to claim 1, wherein said central axis of the rocking is a shaft body arranged in a narrow gap between said first and second receiving rollers.

3. The wheel cleaning apparatus according to claim 2 further comprising a third receiving roller placed at the outside of said roller-assembly frame, said third receiving roller being able to rotate while receiving said at least one, said third receiving roller being almost parallel to said first receiving roller and arranged adjacent to said first receiving roller, the central axis of the rotation of said third receiving roller being placed at a position higher than said central axis of the rocking.

4. The wheel cleaning apparatus according to claim 3, wherein said roller-assembly frame comprises a fall preventing body placed in a narrow gap between said first receiving roller and said third receiving roller, for preventing the wheels from falling into said narrow gap.

5. The wheel cleaning apparatus according to claim 1, wherein at least one of said first and second receiving rollers comprises a tube shaped body made of water-absorbing material and having an elastic contraction characteristic, said tube shaped body being fitted on the outer periphery of a rotary shaft portion, said cleaning means comprises said tube shaped body and washing liquid putting means for wetting the lower side of said tube-shaped body.

6. The wheel cleaning apparatus according to claim 5, wherein said tube shaped body has in its internal periphery a core tube capable of circumferentially sliding on said rotary shaft portion.

7. The wheel cleaning apparatus according to claim 5, wherein said washing liquid putting means is a liquid pooling vessel for soaking the lower side of said tube shaped body in the washing liquid.

8. The wheel cleaning apparatus according to claim 7, wherein said tube shaped body is a circumscribed-type tube shaped body having a core tube the lower arc side of which remains an idle gap and the upper arc side of which contacts with said rotary shaft portion.

9. The wheel cleaning apparatus according to claim 1, wherein each of said receiving rollers comprises a tube shaped body made of water-absorbing material and having an elastic contraction characteristic, said tube shaped body being fitted on the outer periphery of a rotary shaft portion, said cleaning means comprising said tube shaped bodies and washing liquid putting means for wetting the lower side of the tube shaped bodies of said first and second receiving rollers.

10. The wheel cleaning apparatus according to claim 9, wherein each of said tube shaped bodies has in its internal periphery a core tube capable of circumferentially sliding on said rotary shaft portion.

11. The wheel cleaning apparatus according to claim 10, wherein each of said tube shaped bodies is a circumscribed-type tube shaped body having a core tube the lower arc side of which remains an idle gap and the upper arc side of which contacts with said rotary shaft portion.

12. The wheel cleaning apparatus according to claim 9, wherein said washing liquid putting means comprises a first liquid pooling vessel for soaking the lower side of said tube shaped body of said first receiving roller in the washing liquid, and a second liquid pooling vessel for soaking the lower side of said tube shaped body of said second receiving roller in the washing liquid.

13. The wheel cleaning apparatus according to claim 12, wherein said second liquid pooling vessel is in said first liquid pooling vessel, the upper edge of a vessel wall, in the vessel walls of said second liquid pooling vessel, at the side of said first receiving roller, is close to or in contact with the moving-upward outer circumferential surface of the tube shaped body of said first receiving roller.

14. The wheel cleaning apparatus according to claim 13, wherein the upper edge of the vessel wall of said second liquid pooling vessel is at a position higher than the upper edge of the vessel wall of said first pooling vessel.

15. A wheel cleaning apparatus for a device having wheels comprising:
   a right roller-assembly frame and a left roller-assembly frame each including first and second receiving rollers, said first and second receiving rollers being able to rotate while receiving at least one wheel of said wheels, said first and second receiving rollers being almost parallel and arranged facing each other;
   roller driving means synchronously driving the rotation of at least one of said first and second receiving rollers in one of said roller-assembly frames and driving at least one of said first and second receiving rollers in the other one of said roller-assembly frames to each other;
   cleaning means cleaning said at least one wheel driven to rotate on said first and second receiving rollers in each of said roller-assembly frames;
   a rocking and supporting mechanism supporting each of said roller-assembly frames in a positive and negative directions with respect to a central axis of the rocking; and
   energizing means energizing each of said roller-assembly frames in such a way that, in each of said roller-assembly frames, said second receiving roller is energized in a direction to spring up said second receiving roller from said first receiving roller, wherein said energizing means is an elastic means.

16. The wheel cleaning apparatus according to claim 15, wherein said central axis of the rocking is realized by a shaft tube arranged in a narrow gap between said first and second receiving rollers in each of said roller-assembly frames.

17. The wheel cleaning apparatus according to claim 16, wherein said roller driving means comprises a power-transmission shaft penetrating through said shaft tube of either one of said right and left roller-assembly frames.

18. The wheel cleaning apparatus according to claim 17, wherein a first rotary shaft of said first receiving roller in said right roller-assembly frame and a first rotary shaft of said first receiving roller in said left roller-assembly frame are on the same axis through a first junction shaft, and a second rotary shaft of said second receiving roller in said right roller-assembly frame and a second rotary shaft of said second receiving roller in said left roller-assembly frame are on the same axis through a second junction shaft, and the apparatus further comprises a power distributing mechanism for distributing and transmitting a power from said power transmission shaft to said first junction shaft and said second junction shaft.

19. The wheel cleaning apparatus according to claim 18, wherein said power distributing mechanism comprises a first winding and hanging mechanism transmitting the power from said power transmitting shaft to either one of said junction shafts, and a second winding and hanging mechanism transmitting the power from said one of said junction shafts to the other one of said junction shafts.

20. The wheel cleaning apparatus according to claim 18, wherein each of said roller-assembly frames comprises a bearing portion bearing said first and second rotary shafts in such a way as to be able to rotate and to be able to move to tilt, the connecting edge portion of each of said first rotary shaft and said first junction shaft being a mutual inserting-type edge, and a hand touching sleeve fitted on said each connecting edge portion being fixed by fixing means in such a way that it can be attached or removed.

21. The wheel cleaning apparatus according to claim 16 further comprising, in the outside of each of said roller-assembly frames, a third receiving roller, said third receiving roller being able to rotate while receiving at least one of said wheels said third receiving roller being almost parallel to said first receiving roller and arranged adjacent to said first receiving roller, the central axis of the rotation of said third receiving roller being at a position higher than said central axis of the rocking.

22. The wheel cleaning apparatus according to claim 21, wherein each of said roller-assembly frames comprises a fall preventing body placed in a narrow gap between said first receiving roller and said third receiving roller, for preventing the wheels from falling into said narrow gap.

23. The wheel cleaning apparatus according to claim 15, wherein at least one of said first and second receiving rollers in each of said roller-assembly frames comprises a tube shaped body made of water-absorbing material and having an elastic contraction characteristic, said tube shaped body being fitted on the outer periphery of a rotary shaft portion, said cleaning means comprises said tube shaped body and washing liquid putting means for wetting the lower side of said tube-shaped body.

24. The wheel cleaning apparatus according to claim 23, wherein said tube shaped body has in its internal periphery a core tube capable of circumferentially sliding on said rotary shaft portion.

25. The wheel cleaning apparatus according to claim 23, wherein said washing liquid putting means is a liquid pooling vessel for soaking the lower side of said tube shaped body in the washing liquid.

26. The wheel cleaning apparatus according to claim 25, wherein said tube shaped body is a circumscribed-type tube shaped body having a core tube the lower arc side of which remains an idle gap and the upper arc side of which contacts with said rotary shaft portion.

27. The wheel cleaning apparatus according to claim 15, wherein each of said receiving rollers comprises a tube shaped body made of water-absorbing material and having an elastic contraction characteristic, said tube shaped body being fitted on the outer periphery of a rotary shaft portion, said cleaning means comprising said tube shaped bodies and washing liquid putting means for wetting the lower side of the tube shaped bodies of said first and second receiving rollers in said each roller-assembly frame.

28. The wheel cleaning apparatus according to claim 27, wherein each of said tube shaped bodies has in its internal periphery a core tube capable of circumferentially sliding on said rotary shaft portion.

29. The wheel cleaning apparatus according to claim 28, wherein each of said tube shaped bodies is a circumscribed-type tube shaped body having a core tube the lower arc side of which remains an idle gap and the upper arc side of which contacts with said rotary shaft portion.

30. The wheel cleaning apparatus according to claim 27, wherein said washing liquid putting means comprises a first liquid pooling vessel for soaking the lower side of said tube shaped body of said first receiving roller in the washing liquid, and a second liquid pooling vessel for soaking the lower side of said tube shaped body of said second receiving roller in the washing liquid.

31. The wheel cleaning apparatus according to claim 30, wherein said second liquid pooling vessel is in said first liquid pooling vessel, the upper edge of a vessel wall, in the vessel walls of said second liquid pooling vessel, at the side of said first receiving roller, is close to or in contact with the moving-upward outer surface of the tube shaped body of said first receiving roller.

32. The wheel cleaning apparatus according to claim 31, wherein the upper edge of the vessel wall of said second liquid pooling vessel is at a position higher than the upper edge of the vessel wall of said first pooling vessel.

* * * * *